(12) United States Patent
Cullen et al.

(10) Patent No.: US 11,396,134 B2
(45) Date of Patent: Jul. 26, 2022

(54) POWDER DISTRIBUTION FOR LASER SINTERING SYSTEMS

(71) Applicant: 3D Systems, Inc., Rock Hill, SC (US)

(72) Inventors: David H. Cullen, Rock Hill, SC (US); Rafael Enrique Hidalgo, Fort Mill, SC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 309 days.

(21) Appl. No.: 15/265,998

(22) Filed: Sep. 15, 2016

(65) Prior Publication Data

US 2017/0008234 A1 Jan. 12, 2017

Related U.S. Application Data

(63) Continuation of application No. 14/212,770, filed on Mar. 14, 2014, now abandoned.
(Continued)

(51) Int. Cl.
*B29C 64/205* (2017.01)
*B29C 64/357* (2017.01)
(Continued)

(52) U.S. Cl.
CPC ............ *B29C 64/357* (2017.08); *B22F 12/00* (2021.01); *B28B 1/001* (2013.01); *B29C 64/153* (2017.08);
(Continued)

(58) Field of Classification Search
CPC ................................ B29C 64/00; B29C 64/20
See application file for complete search history.

(56) References Cited

U.S. PATENT DOCUMENTS

| | | |
|---|---|---|
| 4,247,508 A | 1/1981 | Housholder |
| 4,863,538 A | 9/1989 | Deckard |

(Continued)

FOREIGN PATENT DOCUMENTS

| | | |
|---|---|---|
| CN | 1135732 | 11/1996 |
| DE | 4400523 | 7/1995 |

(Continued)

OTHER PUBLICATIONS

English translation of Chinese First Office Action for Chinese Patent Application No. 201480026835.2 dated Jul. 4, 2016 (11 pages).
(Continued)

*Primary Examiner* — Matthew J Daniels
*Assistant Examiner* — Andrew D Graham
(74) *Attorney, Agent, or Firm* — Nexsen Pruet, PLLC

(57) ABSTRACT

There is provided improved laser sintering systems that increase the powder density and reduce anomalies of the powder layers that are sintered, that measure the laser power within the build chamber for automatic calibration during a build process, that deposit powder into the build chamber through a chute to minimize dusting, and that scrubs the air and cools the radiant heaters with recirculated scrubbed air. The improvements enable the laser sintering systems to make parts that are of higher and more consistent quality, precision, and strength, while enabling the user of the laser sintering systems to reuse greater proportions of previously used but unsintered powder.

14 Claims, 17 Drawing Sheets

Related U.S. Application Data

(60) Provisional application No. 61/793,870, filed on Mar. 15, 2013.

(51) Int. Cl.
*B29C 64/153* (2017.01)
*B29C 64/165* (2017.01)
*B29C 64/35* (2017.01)
*B22F 12/00* (2021.01)
*B33Y 10/00* (2015.01)
*B33Y 30/00* (2015.01)
*B28B 1/00* (2006.01)
*B22F 3/00* (2021.01)
*B29C 64/329* (2017.01)
*B29C 64/218* (2017.01)
*B22F 10/10* (2021.01)
*B29K 71/00* (2006.01)
*B29K 77/00* (2006.01)
*B29K 105/00* (2006.01)

(52) U.S. Cl.
CPC .......... *B29C 64/165* (2017.08); *B29C 64/205* (2017.08); *B29C 64/35* (2017.08); *B33Y 10/00* (2014.12); *B33Y 30/00* (2014.12); *B22F 3/004* (2013.01); *B22F 10/10* (2021.01); *B29C 64/218* (2017.08); *B29C 64/329* (2017.08); *B29K 2071/00* (2013.01); *B29K 2077/00* (2013.01); *B29K 2105/251* (2013.01); *Y02P 10/25* (2015.11)

(56) References Cited

U.S. PATENT DOCUMENTS

| | | | |
|---|---|---|---|
| 4,944,817 A | 7/1990 | Bourell et al. | |
| 5,017,753 A * | 5/1991 | Deckard | B29C 64/153 264/497 |
| 5,132,143 A | 7/1992 | Deckard | |
| 5,147,587 A * | 9/1992 | Marcus | B22F 3/004 156/272.4 |
| 5,182,170 A | 1/1993 | Marcus et al. | |
| 5,216,235 A | 6/1993 | Lin | |
| 5,252,264 A * | 10/1993 | Forderhase | B33Y 40/00 264/497 |
| 5,354,414 A | 10/1994 | Feygin | |
| 5,427,733 A | 6/1995 | Benda et al. | |
| 5,530,221 A | 6/1996 | Benda et al. | |
| 5,534,104 A | 7/1996 | Langer et al. | |
| 5,536,467 A | 7/1996 | Reichle et al. | |
| 5,647,931 A | 7/1997 | Retallick et al. | |
| 5,658,412 A | 8/1997 | Retallick et al. | |
| 5,665,401 A | 9/1997 | Serbin et al. | |
| 5,730,925 A | 3/1998 | Mattes et al. | |
| 5,733,497 A | 3/1998 | McAlea et al. | |
| 5,753,171 A | 5/1998 | Serbin et al. | |
| 5,753,274 A | 5/1998 | Wilkening et al. | |
| 5,786,562 A | 7/1998 | Larson | |
| 5,817,206 A | 10/1998 | McAlea et al. | |
| 5,832,415 A | 11/1998 | Wilkening | |
| 5,846,370 A | 12/1998 | O'Connor | |
| 5,876,550 A | 3/1999 | Feygin et al. | |
| 5,876,767 A | 3/1999 | Mattes et al. | |
| 5,897,825 A | 4/1999 | Fruth et al. | |
| 5,904,889 A | 5/1999 | Serbin et al. | |
| 5,904,890 A | 5/1999 | Lohner et al. | |
| 5,908,569 A | 6/1999 | Wilkening et al. | |
| 5,934,343 A * | 8/1999 | Gaylo | B29C 64/218 141/12 |
| 6,042,774 A | 3/2000 | Wilkening et al. | |
| 6,085,122 A | 6/2000 | Manning | |
| 6,136,257 A | 10/2000 | Graf et al. | |
| 6,151,345 A | 11/2000 | Gray | |
| 6,155,331 A | 12/2000 | Langer et al. | |
| 6,213,168 B1 * | 4/2001 | Gaylo | B22F 3/004 141/12 |
| 6,425,281 B1 | 7/2002 | Sheriff et al. | |
| 6,483,596 B1 | 11/2002 | Philippi et al. | |
| 6,554,600 B1 | 4/2003 | Hofmann et al. | |
| 6,596,224 B1 * | 7/2003 | Sachs | B22F 3/008 264/113 |
| 6,600,129 B2 | 7/2003 | Shen et al. | |
| 6,617,546 B2 | 9/2003 | Manetsberger et al. | |
| 6,672,343 B1 | 1/2004 | Perret et al. | |
| 6,677,554 B2 | 1/2004 | Darrah et al. | |
| 6,694,207 B2 | 2/2004 | Darrah et al. | |
| 6,814,926 B2 | 11/2004 | Geving et al. | |
| 6,815,636 B2 | 11/2004 | Chung et al. | |
| 6,823,928 B2 | 11/2004 | Sercombe et al. | |
| 6,824,714 B1 | 11/2004 | Turck et al. | |
| 6,848,494 B2 | 2/2005 | Newell et al. | |
| 6,858,816 B2 | 2/2005 | Manetsberger et al. | |
| 6,930,278 B1 * | 8/2005 | Chung | B23K 26/34 219/121.85 |
| 6,932,935 B1 | 8/2005 | Oberhofer et al. | |
| 7,521,652 B2 | 1/2006 | Chung et al. | |
| 6,997,232 B2 | 2/2006 | Sercombe et al. | |
| 7,036,550 B2 | 5/2006 | Schaffer et al. | |
| 7,153,463 B2 | 12/2006 | Leuterer et al. | |
| 7,261,542 B2 | 8/2007 | Hickerson et al. | |
| 7,296,599 B2 | 11/2007 | Cox | |
| 7,297,304 B2 | 11/2007 | Swanson et al. | |
| 7,357,629 B2 | 4/2008 | Weiskopf et al. | |
| 7,419,632 B2 | 9/2008 | Keller | |
| 7,464,733 B2 | 12/2008 | Cox | |
| 7,569,174 B2 | 8/2009 | Ruatta et al. | |
| 7,601,422 B2 | 10/2009 | Gersch et al. | |
| 7,614,866 B2 | 11/2009 | Sperry et al. | |
| 7,628,600 B2 | 12/2009 | Perret | |
| 7,647,107 B2 | 1/2010 | Perret et al. | |
| 7,661,948 B2 | 2/2010 | Perret et al. | |
| 7,665,979 B2 | 2/2010 | Heugel | |
| 7,686,005 B2 | 3/2010 | Adams | |
| 7,713,048 B2 | 5/2010 | Perret et al. | |
| 7,740,683 B2 | 6/2010 | Thorsson et al. | |
| 7,790,096 B2 | 9/2010 | Merot et al. | |
| 7,807,947 B2 | 10/2010 | Partannen et al. | |
| 7,820,241 B2 | 10/2010 | Perret et al. | |
| 7,837,458 B2 | 11/2010 | Perret et al. | |
| 7,847,057 B2 | 12/2010 | Muller et al. | |
| 7,850,885 B2 | 12/2010 | Philippi et al. | |
| 7,887,316 B2 | 2/2011 | Cox | |
| 7,891,095 B2 | 2/2011 | Jonsson et al. | |
| 7,931,462 B2 | 4/2011 | Mattes | |
| 7,946,840 B2 | 5/2011 | Perret et al. | |
| 7,976,302 B2 | 7/2011 | Halder et al. | |
| 8,031,384 B2 | 10/2011 | Perret et al. | |
| 8,032,479 B2 | 10/2011 | Dimter et al. | |
| 8,073,315 B2 | 12/2011 | Philippi | |
| 8,075,814 B2 | 12/2011 | Fruth et al. | |
| 8,083,513 B2 | 12/2011 | Montero-Escuder et al. | |
| 8,119,053 B1 | 2/2012 | Bedal et al. | |
| 8,124,192 B2 | 2/2012 | Paasche et al. | |
| 8,137,739 B2 | 3/2012 | Philippi et al. | |
| 8,172,562 B2 | 5/2012 | Mattes | |
| 8,186,990 B2 | 5/2012 | Perret et al. | |
| 8,299,208 B2 | 7/2012 | Muller et al. | |
| 8,260,447 B2 | 9/2012 | Mattes et al. | |
| 8,303,886 B2 | 11/2012 | Philippi | |
| 8,313,087 B2 | 11/2012 | Hesse et al. | |
| 8,317,508 B2 | 11/2012 | Bokodi et al. | |
| 8,366,432 B2 | 2/2013 | Perret et al. | |
| 8,414,281 B2 | 4/2013 | Schleiss et al. | |
| 8,420,001 B2 | 4/2013 | Leuterer et al. | |
| 8,501,075 B2 | 8/2013 | Philippi et al. | |
| 8,525,071 B2 | 9/2013 | Lueterer | |
| 8,794,263 B2 | 8/2014 | Scott et al. | |
| 8,877,874 B2 | 11/2014 | Paternoster | |
| 2001/0050448 A1 | 12/2001 | Kubo et al. | |
| 2002/0090313 A1 | 7/2002 | Wang et al. | |
| 2002/0104973 A1 | 8/2002 | Kerekes | |
| 2003/0201255 A1 | 10/2003 | Manetsberger | |
| 2004/0061260 A1 | 4/2004 | Heugel | |

(56) References Cited

U.S. PATENT DOCUMENTS

| | | | |
|---|---|---|---|
| 2004/0200816 A1* | 10/2004 | Chung | G05D 23/1919 |
| | | | 219/121.83 |
| 2005/0207931 A1 | 9/2005 | Hesse et al. | |
| 2005/0242473 A1 | 11/2005 | Newell et al. | |
| 2005/0263933 A1* | 12/2005 | Welch | B33Y 30/00 |
| | | | 264/113 |
| 2005/0263934 A1* | 12/2005 | Chung | B29C 64/153 |
| | | | 264/113 |
| 2006/0214335 A1* | 9/2006 | Cox | B01F 3/188 |
| | | | 264/497 |
| 2006/0215246 A1* | 9/2006 | Kerekes | G02B 26/101 |
| | | | 359/201.1 |
| 2006/0219315 A1* | 10/2006 | Cox | B65G 53/22 |
| | | | 141/67 |
| 2007/0057412 A1 | 3/2007 | Weiskofp et al. | |
| 2007/0063372 A1* | 3/2007 | Nielsen | B29C 64/165 |
| | | | 264/113 |
| 2007/0087071 A1* | 4/2007 | Devos | B33Y 50/02 |
| | | | 425/375 |
| 2007/0267784 A1 | 11/2007 | Greiner | |
| 2007/0298182 A1 | 12/2007 | Hans et al. | |
| 2008/0036117 A1 | 2/2008 | Hickerson et al. | |
| 2008/0122141 A1 | 5/2008 | Bedal et al. | |
| 2008/0152910 A1 | 6/2008 | Hesse et al. | |
| 2008/0190905 A1 | 8/2008 | Heinlein | |
| 2008/0211132 A1* | 9/2008 | Feenstra | B22F 3/1055 |
| | | | 264/113 |
| 2009/0025638 A1* | 1/2009 | Inoue | B29B 17/0005 |
| | | | 428/402 |
| 2009/0045553 A1 | 2/2009 | Weidinger et al. | |
| 2009/0047165 A1 | 2/2009 | Syvanen et al. | |
| 2009/0152771 A1 | 6/2009 | Philippi et al. | |
| 2009/0266803 A1 | 10/2009 | Perret et al. | |
| 2009/0291308 A1* | 11/2009 | Pfister | B29B 17/0005 |
| | | | 428/402 |
| 2009/0295042 A1 | 12/2009 | Pfister et al. | |
| 2009/0321998 A1 | 12/2009 | Gersch et al. | |
| 2010/0140550 A1 | 6/2010 | Keller et al. | |
| 2010/0155985 A1 | 6/2010 | McAlea et al. | |
| 2010/0264302 A1 | 10/2010 | Philippi | |
| 2010/0270713 A1 | 10/2010 | Frangov et al. | |
| 2011/0122381 A1 | 5/2011 | Hickerson et al. | |
| 2011/0133367 A1 | 6/2011 | Weidinger et al. | |
| 2011/0165340 A1 | 7/2011 | Baumann | |
| 2011/0168091 A1 | 7/2011 | Baumann et al. | |
| 2011/0174552 A1 | 7/2011 | Ahmed | |
| 2011/0221099 A1 | 9/2011 | Oberhofer et al. | |
| 2011/0237731 A1 | 9/2011 | Paternoster | |
| 2011/0278773 A1 | 11/2011 | Bokodi et al. | |
| 2011/0293771 A1 | 12/2011 | Oberhofer et al. | |
| 2012/0070666 A1 | 3/2012 | Gersch et al. | |
| 2012/0090734 A1 | 4/2012 | Heinlein | |
| 2012/0107438 A1 | 5/2012 | Bokodi et al. | |
| 2012/0107496 A1 | 5/2012 | Thoma | |
| 2012/0164322 A1* | 6/2012 | Teulet | B22F 3/1055 |
| | | | 118/103 |
| 2012/0267813 A1 | 10/2012 | Perret et al. | |
| 2013/0000553 A1 | 1/2013 | Hoechsmann et al. | |
| 2013/0064707 A1* | 3/2013 | Matsui | B29C 64/165 |
| | | | 419/61 |
| 2013/0171019 A1 | 7/2013 | Gessler et al. | |
| 2013/0330470 A1 | 12/2013 | Gersch et al. | |
| 2014/0265045 A1* | 9/2014 | Cullen | B29C 64/205 |
| | | | 264/497 |
| 2014/0287080 A1 | 9/2014 | Scott et al. | |
| 2014/0329953 A1 | 11/2014 | Paternoster | |
| 2014/0363585 A1* | 12/2014 | Pialot | B22F 3/1055 |
| | | | 427/551 |

FOREIGN PATENT DOCUMENTS

| | | |
|---|---|---|
| DE | 10360094 | 9/2005 |
| EP | 1700686 | 9/2006 |
| EP | 1700686 A2 | 9/2006 |
| EP | 1704989 | 9/2006 |
| EP | 1771267 A1 | 4/2007 |
| JP | 8502703 | 3/1996 |
| JP | 9507882 | 8/1997 |
| JP | 2001038812 | 2/2001 |
| JP | 2001-334581 | 12/2001 |
| JP | 2003-245981 | 9/2003 |
| JP | 2004-306612 | 11/2004 |
| JP | 2006-248231 | 9/2006 |
| JP | 2011-202165 | 10/2011 |
| JP | 2012-501828 | 1/2012 |
| WO | 95/11100 | 4/1995 |
| WO | 95/34468 | 12/1995 |
| WO | 9534468 | 12/1995 |
| WO | 01/81031 | 11/2001 |
| WO | 2004/056512 | 7/2004 |
| WO | 2007-147221 | 12/2007 |
| WO | 2010061174 | 6/2010 |
| WO | 2010095987 | 8/2010 |

OTHER PUBLICATIONS

Chinese Translation of China's Second Office Action for Chinese Patent Application No. 201480026842.2 dated Nov. 9, 2017 (6 pages).
Japanese Translation of Japan's First Office Action for Japanese Patent Application No. 2016-502848 dated Aug. 16, 2016 (5 pages).
European Search Report for Application No. EP 05007528.2, Date of Completion of Search Sep. 16, 2005 (3 pages).
European Search Report for Application No. EP 05007626.4, Date of Completion of Search Sep. 16, 2005 (3 pages).
German Examination Report for Application No. DE 102005015985.0, dated Jan. 31, 2006 (4 pages—no English translation).
German Examination Report for Application No. DE 102005015986.0, dated Feb. 2, 2006 (4 pages—no English translation).
European Examination Report for Application No. EP 05007528.2, dated Dec. 12, 2006 (4 pages).
European Examination Report for Application No. EP 05007528.2, dated Nov. 7, 2007 (3 pages).
European Examination Report for Application No. EP 05007626.4, dated Aug. 11, 2006 (5 pages).
Japanese Office Action for Counterpart Japanese Application No. JP 2005-155059, dated Jan. 22, 2008 (2 pages).
Japanese Office Action for Application No. JP 2005-155060, dated Jan. 30, 2008 (2 pages).
Office Action dated Jan. 7, 2008 in U.S. Appl. No. 10/856,289.
Office Action dated Jan. 8, 2008 in U.S. Appl. No. 10/856,303.
PCT Partial International Search Report for the International Searching Authority for PCT/US2014/028621 dated Oct. 15, 2014 (6 pages).
PCT International Search Report for the International Searching Authority for PCT/US2014/028671 dated Sep. 3, 2014 (6 pages).
PCT Written Opinion for the International Searching Authority for PCT/US2014/028671 dated Sep. 3, 2014 (8 pages).
PCT International Search Report for the International Searching Authority for PCT/US2014/028621 dated Jan. 5, 2015 (8 pages).
PCT Written Report for the International Searching Authority for PCT/US2014/028621 dated Jan. 5, 2015 (10 pages).
PCT Preliminary International Search Report for the International Searching Authority for PCT/US2014/028671 dated Sep. 24, 2015 (2 pages).
PCT Written Opinion for the International Searching Authority for PCT/US2014/028671 dated Sep. 24, 2015 (8 pages).
PCT Preliminary International Search Report for the International Searching Authority for PCT/US2014/028621 dated Sep. 24, 2015 (2 pages).
PCT Written Opinion for the International Searching Authority for PCT/US2014/028621 dated Sep. 24, 2015 (10 pages).
Chinese Translation of China's First Office Action for Chinese Patent Application No. 201480026842.2 dated Jan. 3, 2017 (15 pages).

(56) References Cited

OTHER PUBLICATIONS

European Extended Search Report for European Patent Application No. 19712241.2 dated Aug. 27, 2019 (9 pages).

* cited by examiner

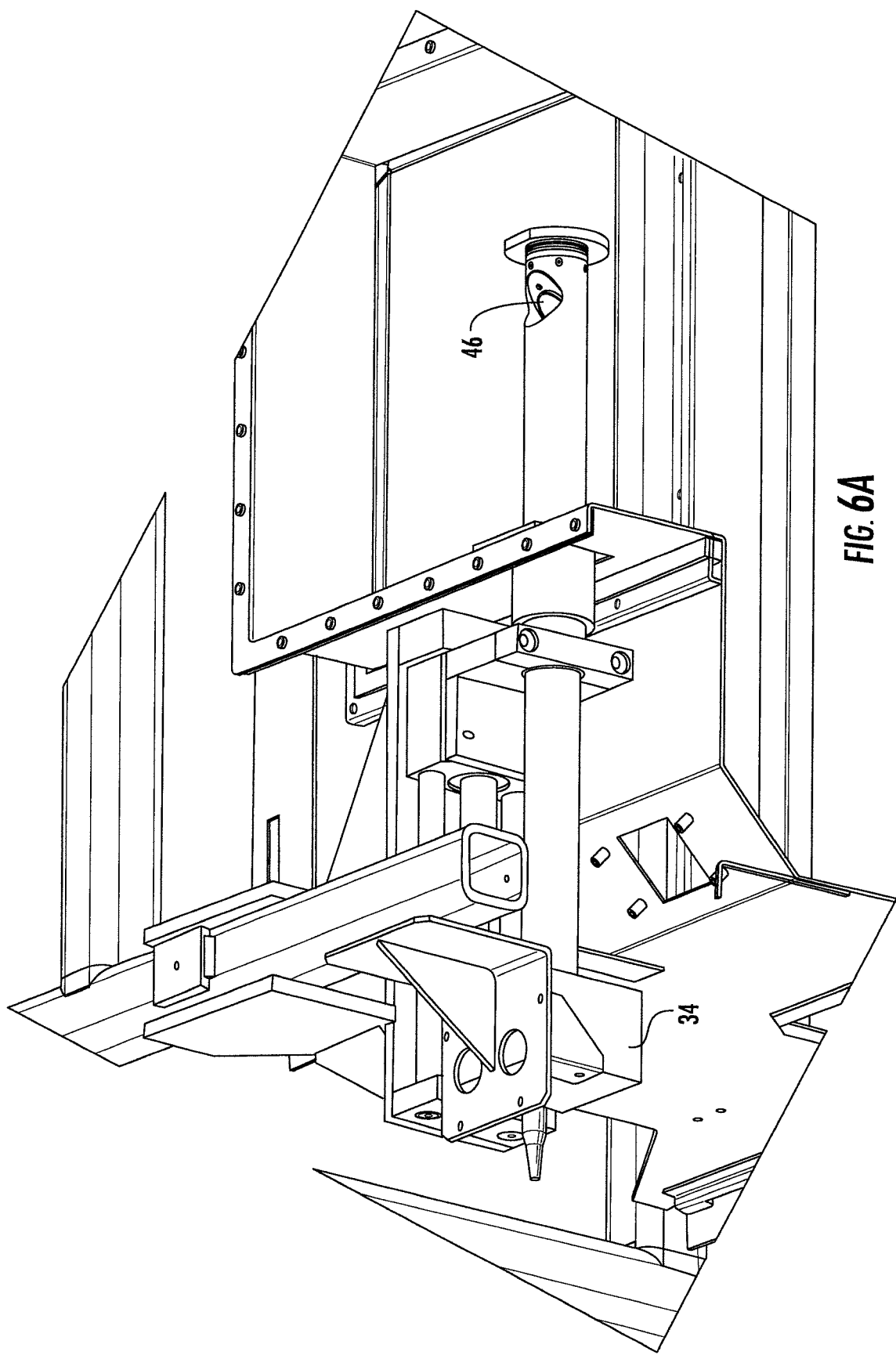

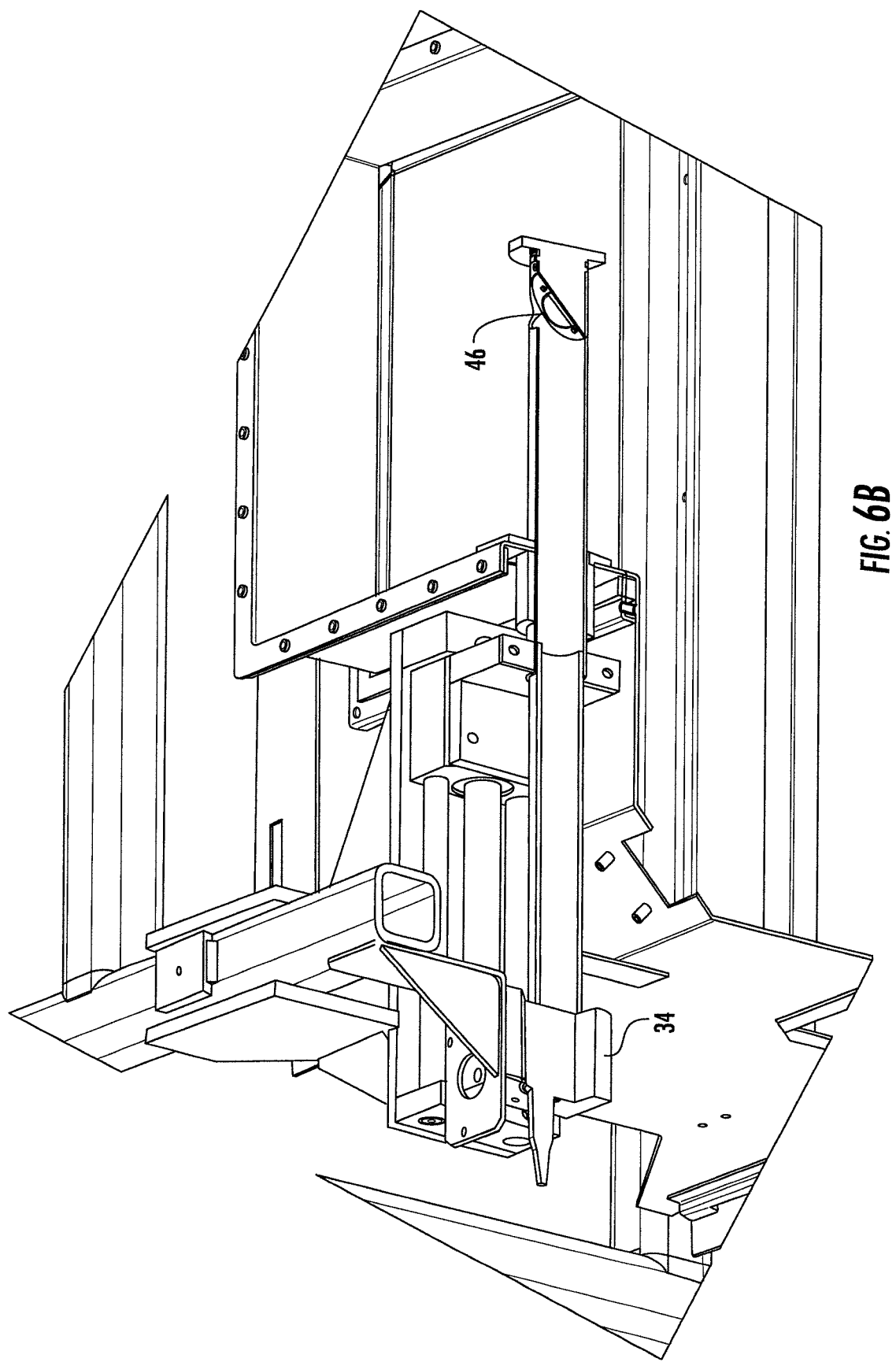

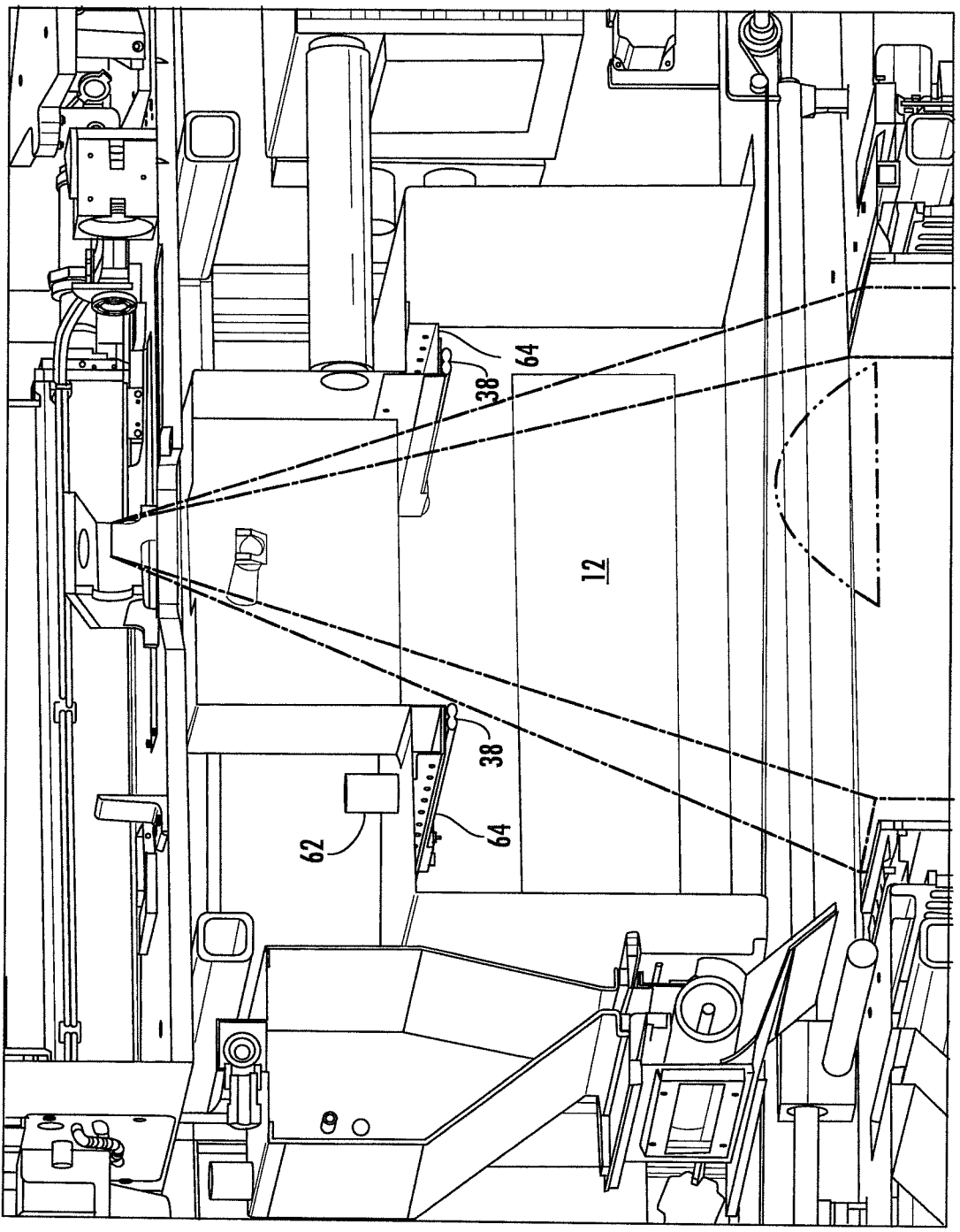

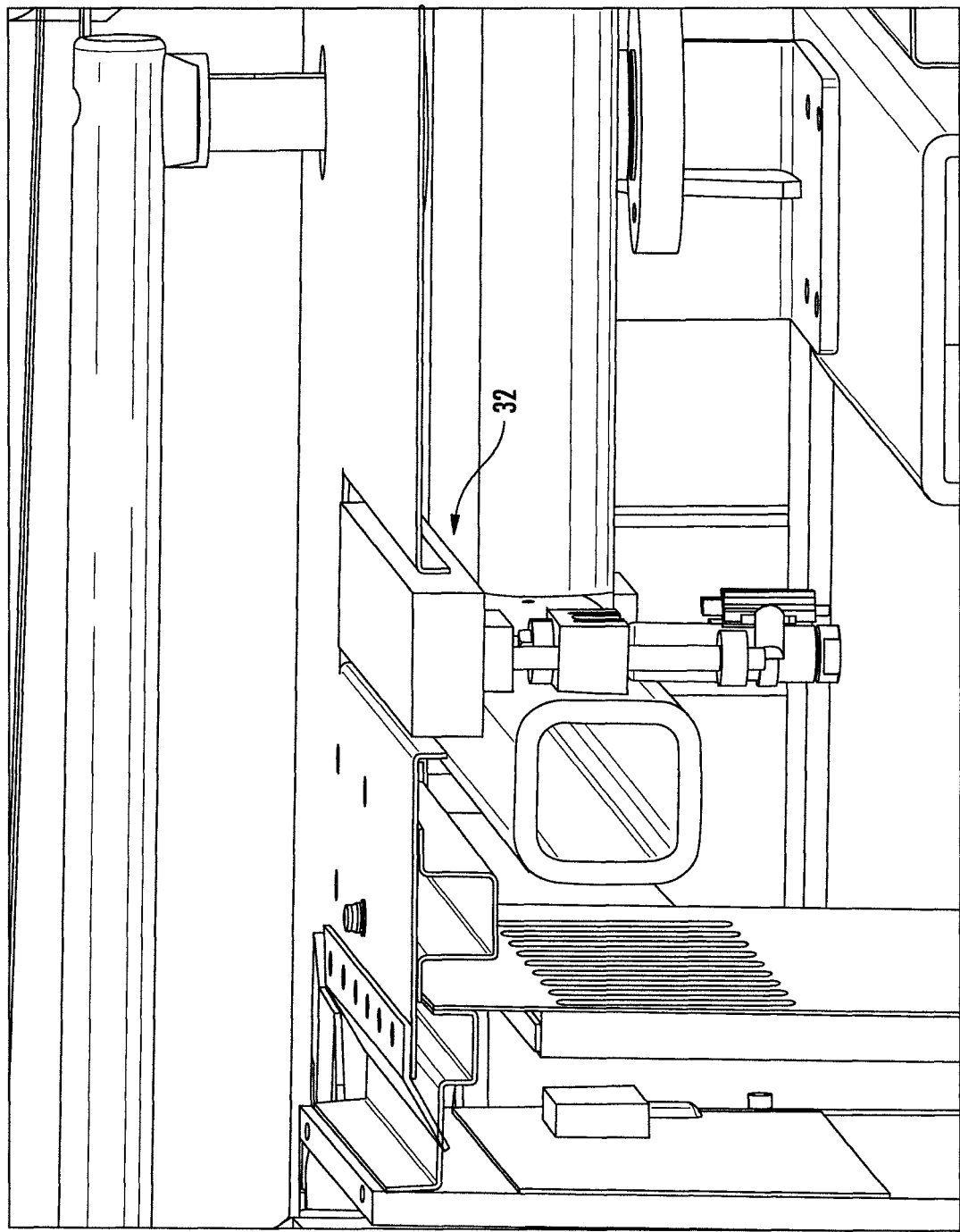

POWDER DISTRIBUTION FOR LASER SINTERING SYSTEMS

CROSS REFERENCE TO RELATED APPLICATION

This application is a continuation of copending U.S. patent application Ser. No. 14/212,770, filed Mar. 14, 2014, which is hereby incorporated herein in its entirety by reference. The application claims the benefit of U.S. Provisional Patent Application Ser. No. 61/793,870 filed on Mar. 15, 2013, which is hereby incorporated by reference herein in its entirety.

FIELD OF THE INVENTION

The present invention is related to laser sintering systems, and more particularly, to laser sintering systems apparatus and methods for improving part quality and reduced disposal of used, unsintered powder.

BACKGROUND OF THE INVENTION

Laser sintering is one form of additive manufacturing that fabricates three-dimensional objects from digital data. As known in the art, laser sintering heats layers of powder, typically a polymer or a metal, with a laser to cause the powder particles to fuse to one another in predetermined patterns to define the cross-sectional layers of the object being fabricated. Such techniques are disclosed in U.S. Pat. Nos. 4,863,538; 5,155,321; 5,252,264; 5,352,405; 6,815,636; 7,569,174; and 7,807,947, the disclosures of which are incorporated by reference herein in their entirety.

One problem with laser sintering is laser attenuation during the build process whereby the laser power at the image plane (the surface of the sinterable powder being exposed to the laser beam) changes (typically decreases). Such change in laser power may be due to a number of issues and can lead to parts being different colors from the bottom to the top (along the z-axis) or having different mechanical properties along the z-axis.

Another problem with laser sintering, particularly with polymers that are heated to near the melting temperature, is that the sinterable powder that is not fused can be reused only a certain number of times before the powder produces parts with undesirable quality (such as "orange peeling" on the surface), coloration, or reduced mechanical properties. The result is that operators of laser sintering machines must dispose of certain amount of used laser sintering powder maintain part quality.

BRIEF SUMMARY OF THE INVENTION

The various embodiments of the present invention address the above needs and achieve other advantages that improve the part quality and reduce the need to dispose of sinterable powder. One embodiment of the present invention includes methods for applying the powder layer to reduce the likelihood of surface features that can lead to reduced part strength or accuracy and that improve the density of the powder in the layer. Certain embodiments use a "two pass" approach (also called "dual APL" (APL=Apply Powder Layer) to laying down a single layer of powder (with a counter-rotating roller or other powder distributing device) by distributing a layer of powder in a first pass similar to traditional (prior art) applications of a powder layer, but then, unlike the prior art, the roller is moved back in a second pass that distributes residual powder to fill gaps and level the surface of the powder layer. In order to distribute the residual powder from the first pass, a return powder device (such as a piston) is provided on an opposite side of the part bed (the area where the powder is laser sintered) from where the powder is deposited by a hopper. The return powder device is lowered to allow the residual powder to pass beneath the roller and is raised after the roller has passed so that the roller can distribute the residual powder. Any residual powder that remains after the second pass is deposited into a powder return shoot on the side of the part bed. By using the two pass technique, the powder layers have improved uniformity and better densification for more accurate laser sintering.

Further embodiments of the present invention include a laser power measurement device that is able to measure laser power within the build chamber. Typical laser sintering systems do not include laser power measurement devices (measurements are simply done during service by a serviceperson) or the laser power is measure prior to the laser beam entering the build chamber. The build chamber of a laser sintering system is typically very hot and includes fumes and dust that can adversely affect surfaces. The present invention provides a laser power measurement device that is within the build chamber to determine the laser power delivered to the powder layers in order to adjust or control the scan speed and/or other parameters to ensure that the power being delivered to the sinterable powder is consistent to avoid degradation or other changes in part quality or accuracy. In some embodiments, the laser power measurement device is positioned below the laser window (typically on the ceiling of the build chamber through which the laser enters the build chamber), but above the heaters that heat the sinterable powder (primarily by radiation) so that the device does not block heat delivered to the powder and/or become overheated. By having the laser power measurement device removed as much as possible from the image plane upon which the laser beam is focused, the laser is less focused and the sensing device is better able to withstand the laser without being adversely affected by the laser. In some embodiments, the laser power measurement device comprises a movable mirror that is extended from a position outside the laser scanning area into a position where the laser can be directed to the mirror to direct the laser to the sensing device. Once the measurement has been taken, the mirror can be retracted out of the way of the laser. In some embodiments, the laser power measurements are taken during the application of a new powder layer so that the build time for the part(s) is not increased. In further embodiments, the laser power measurement device is a sensor on a movable (such as rotatable) arm that may be selectively positioned for the laser to project directly onto it.

Still further embodiments of the present invention include a chute device for the deposition of powder between the roller and part bed with little or no dust being created. The chute device of certain embodiments is a rigid slot below the hopper that extends to near the surface the powder is being deposited to minimize the distance the powder must fall, thus minimizing the amount of dust created. The chute device is rotatable so that it does not interfere with the movement of the roller. The chute is also positioned so that it does not block the laser beam from the part bed. In some embodiments, the chute includes heater elements to preheat the powder to be deposited.

Other embodiments of the present invention include a roller heater positioned below or proximate the stationary roller position (where the roller is parked during the laser scanning operation) so that the roller surface may be heated to a desired temperature. The roller heater may alternatively comprise a chute heater that pre-heats powder in the chute and also heats the roller surface. The roller may be rotated so that the roller heater evenly heats the surface of the roller to prevent temperature gradients on the roller surface which can lead to undesirable adhesion of powder to some, but not all, surfaces of the roller which results in powder being slung behind the roller which further results in uneven powder surfaces that ultimately result in rough surfaces or other imperfections in the final part.

Still further embodiments of the present invention include an air scrubber that cleans the air (consisting primarily of nitrogen) within the build chamber. The air is cooled through the scrubber to assist with the removal of airborne contaminants by the filter(s). The exhaust air of the scrubber that is recirculated back into the build chamber is exhausted into a heater bracket that retains the heaters (that heat the powder by radiation and convection) in order to (i) reheat the relatively cool recirculated air and (ii) cool the heater brackets and heaters so that the heaters are not overheated. The heater brackets have exhaust holes along an outwardly facing surface so that the air is circulated back into the chamber in a way that does not create significant turbulence or other undesirable air flow that could adversely affect the laser sintering process. Therefore, the various embodiments of the present invention provide significant improvements to the laser sintering system and process that result in improved part quality and reduced waste material.

BRIEF DESCRIPTION OF THE SEVERAL VIEWS OF THE DRAWINGS

Figure 1:
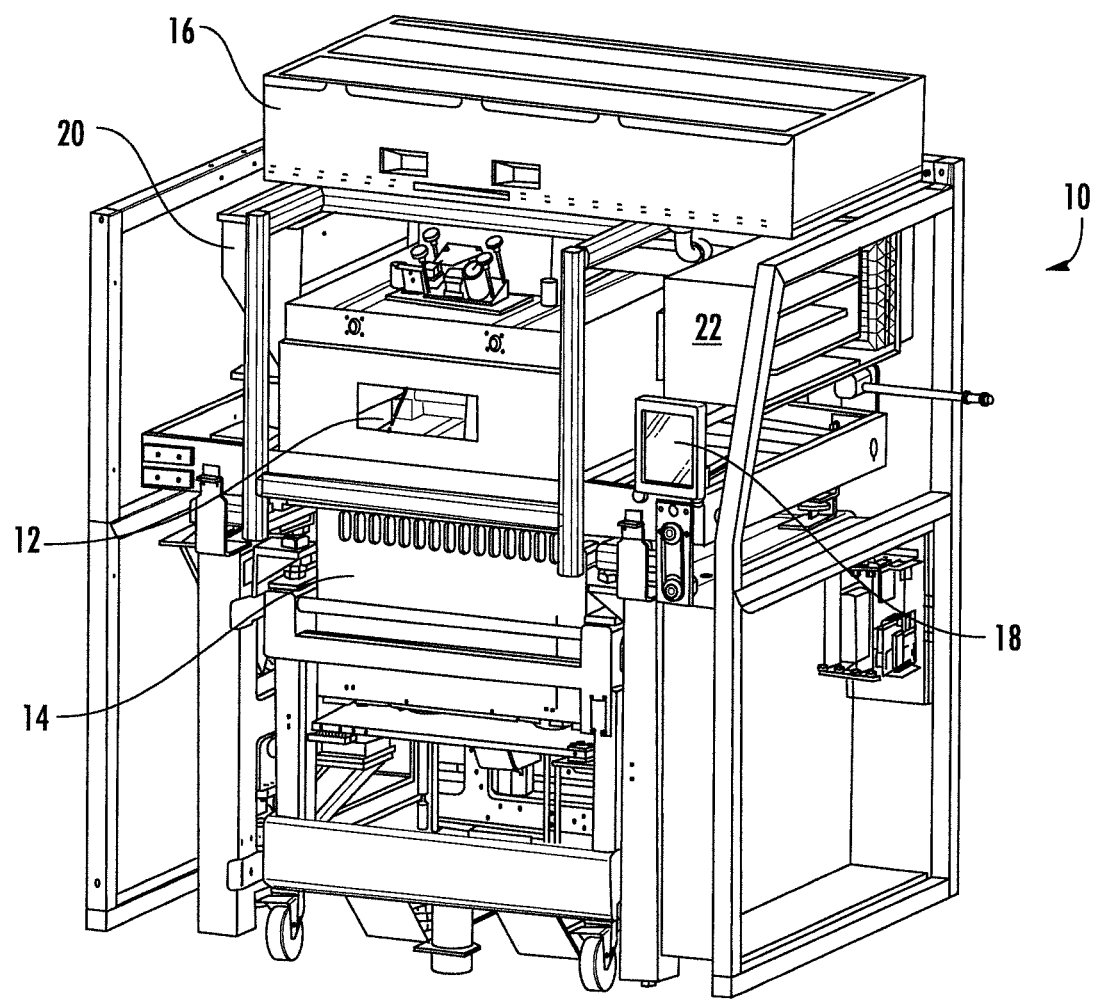
Figure 2:
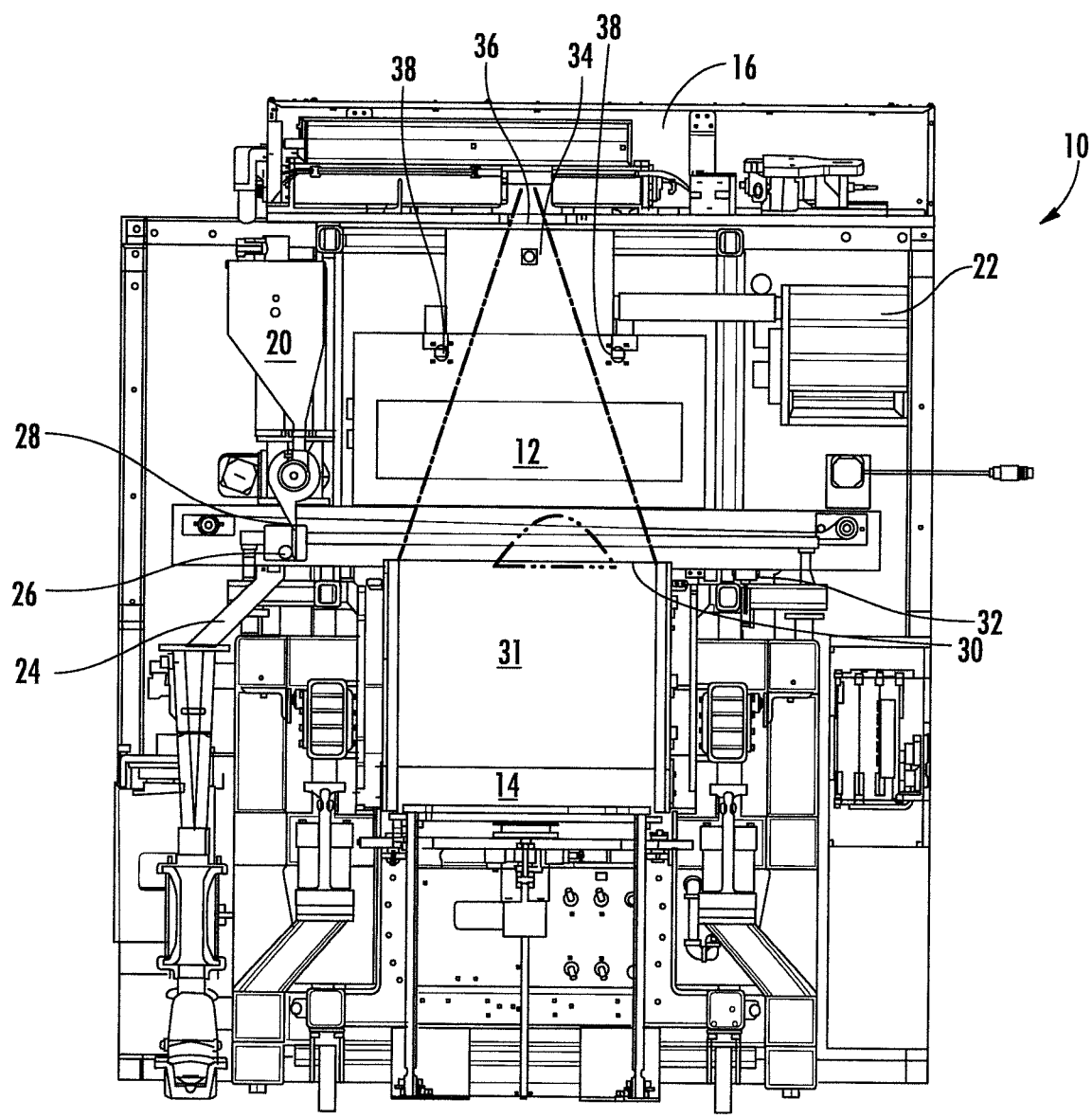
Figure 3A:
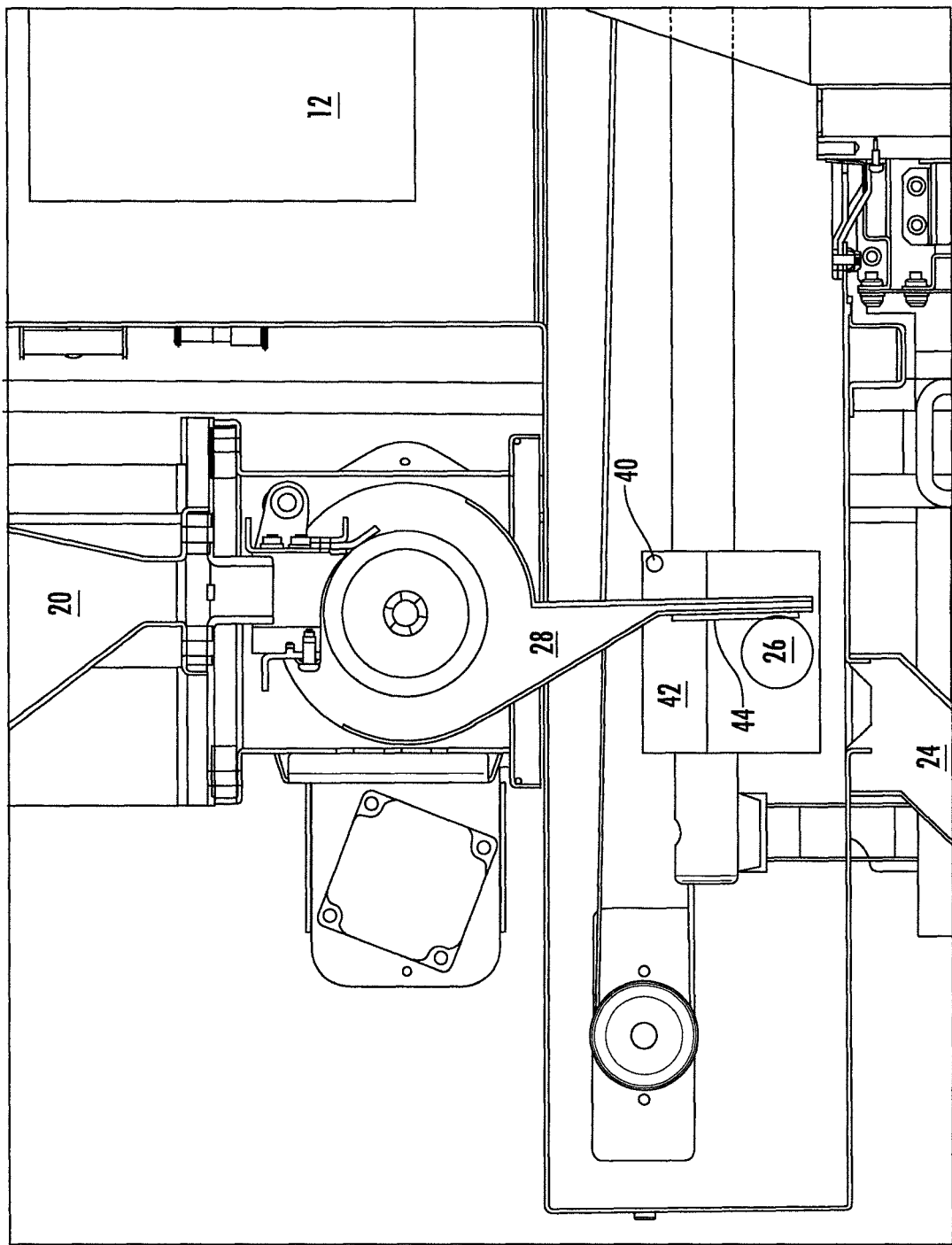
Figure 3B:
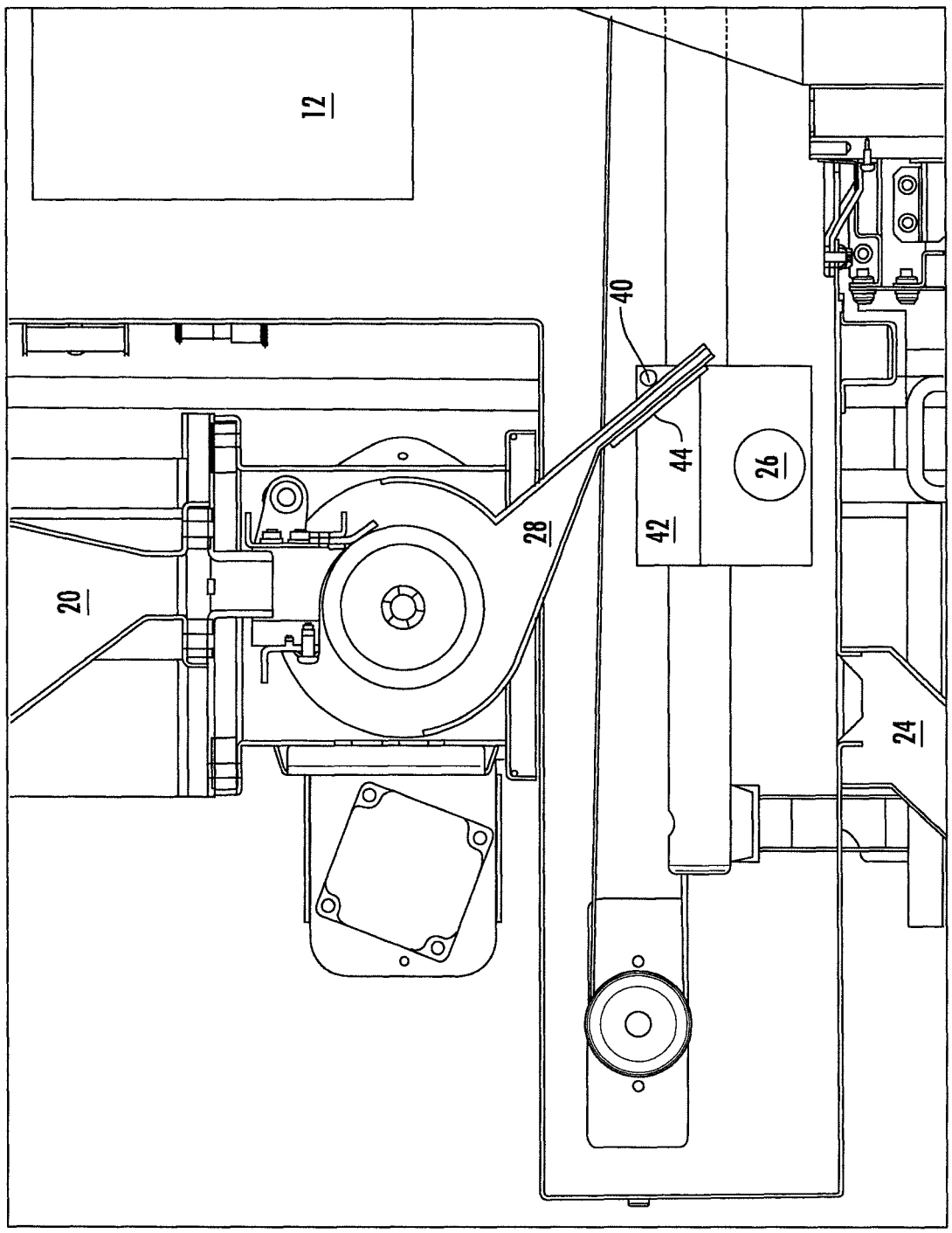
Figure 4A:
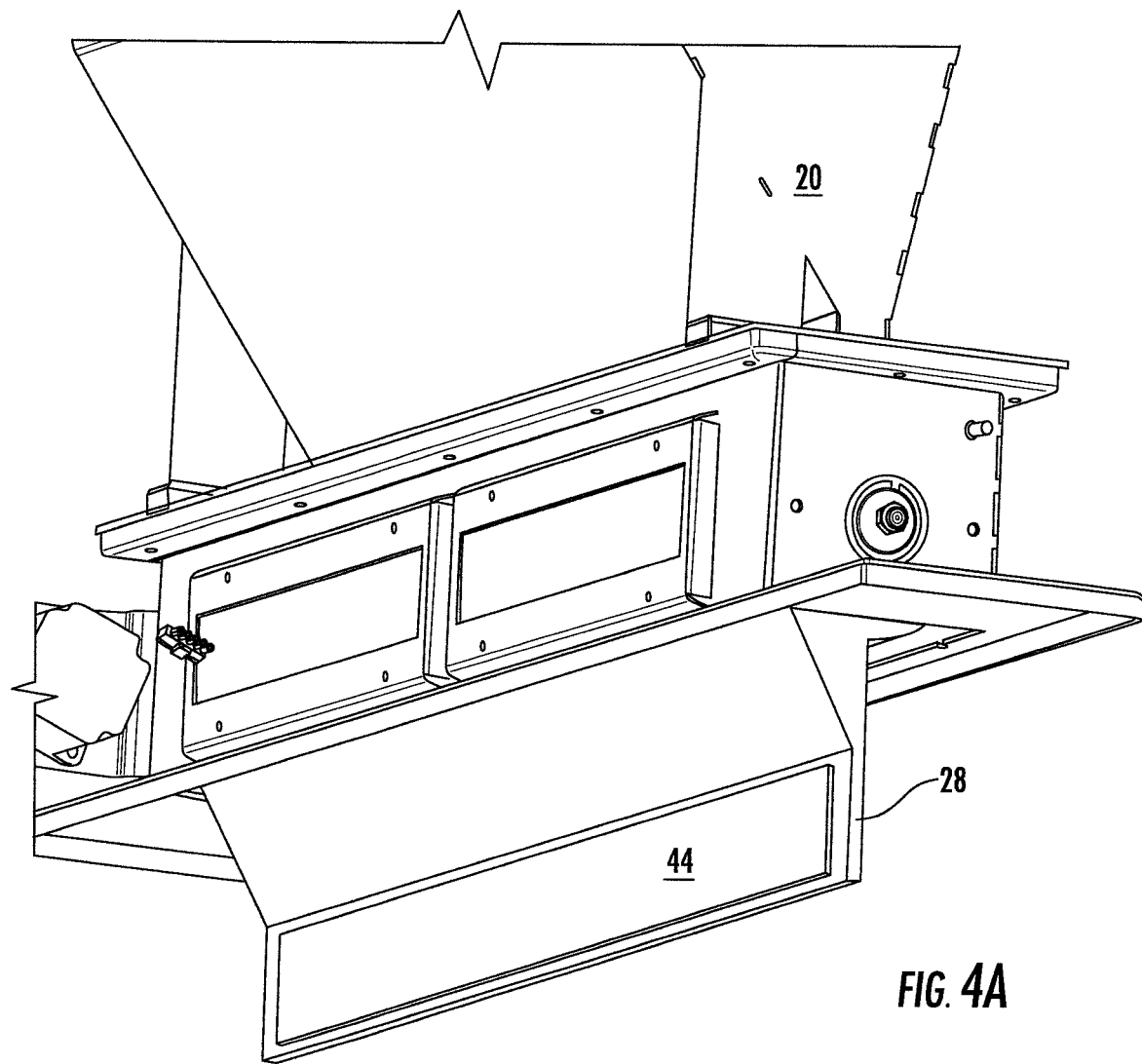
Figure 4B:
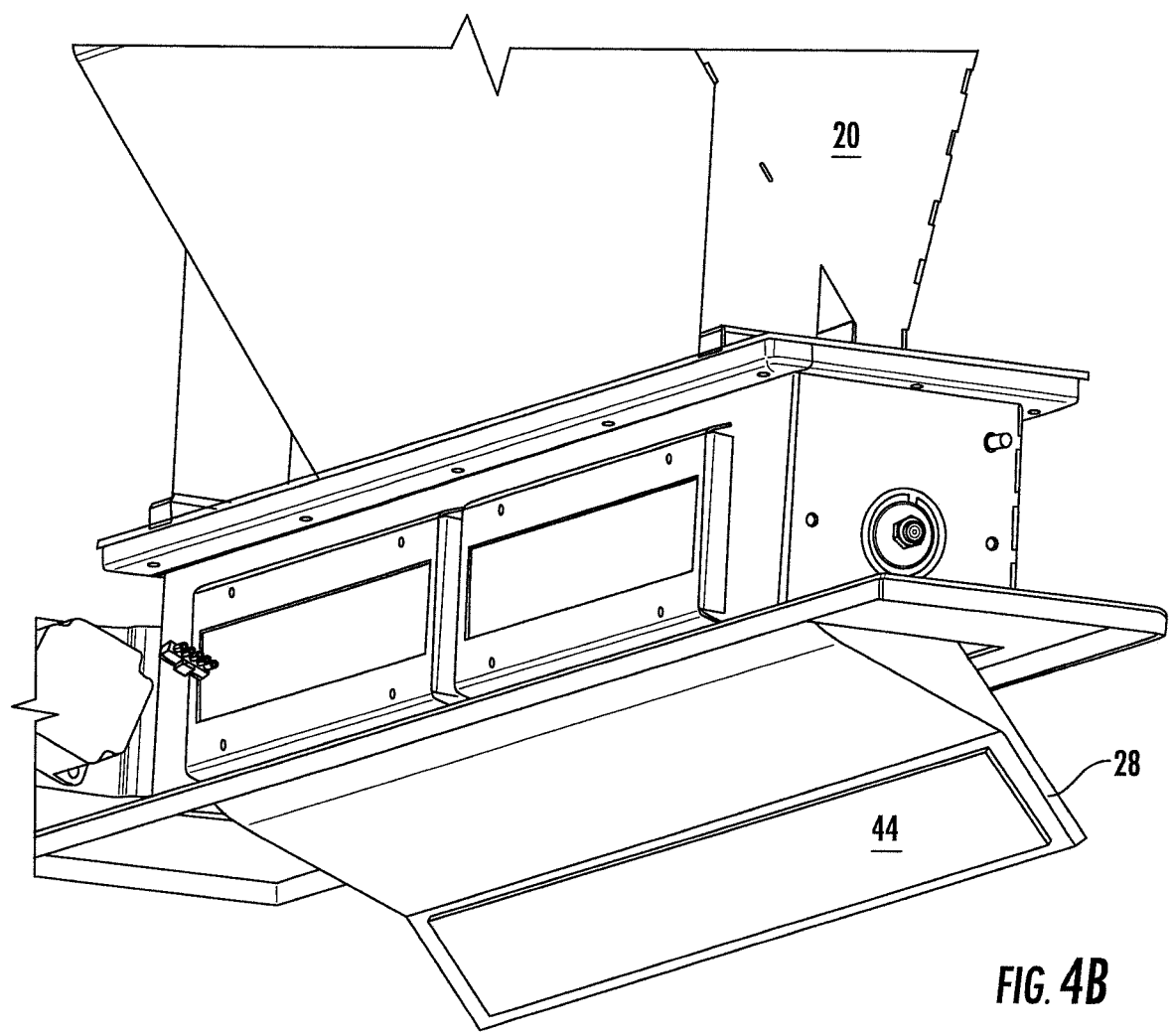
Figure 5A:
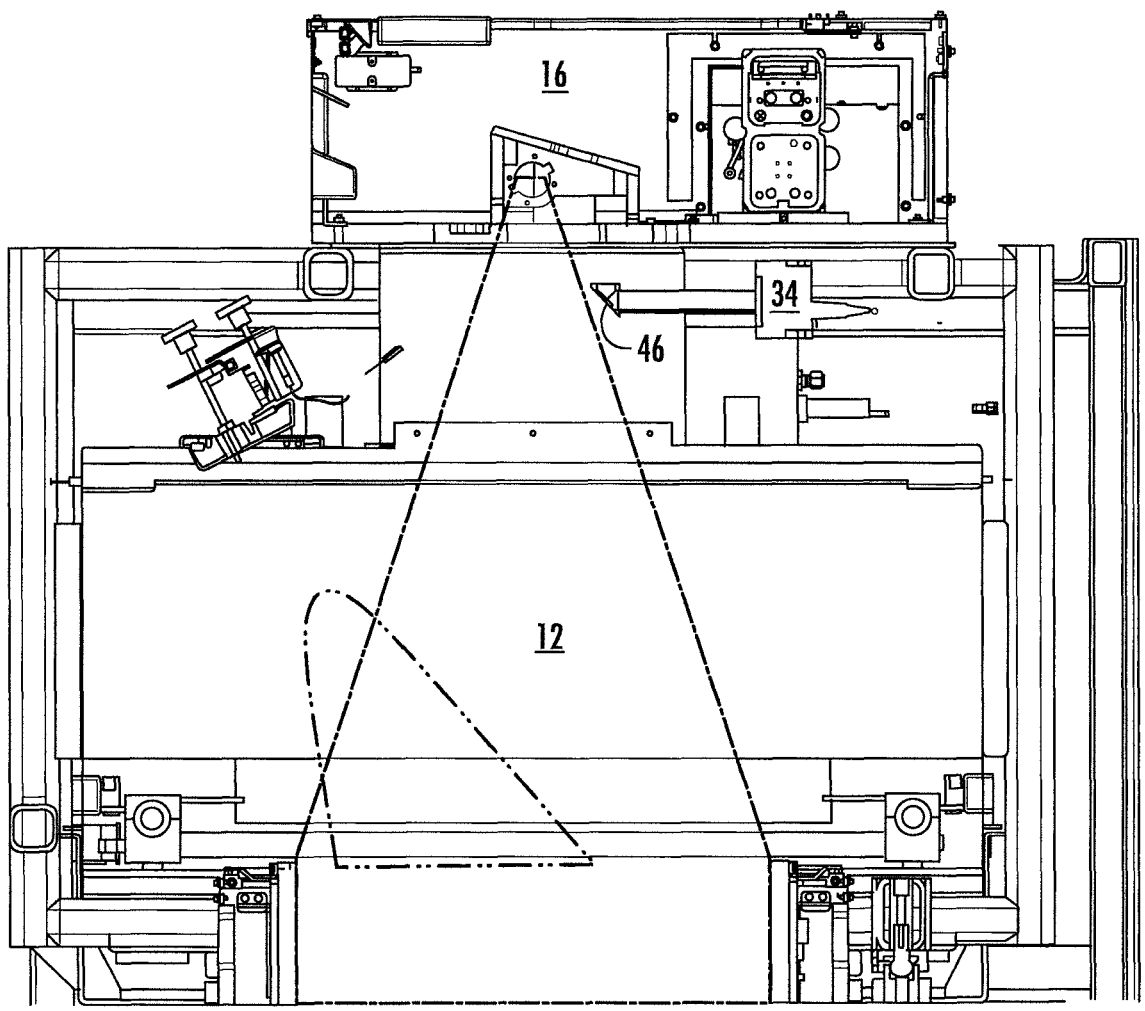
Figure 5B:
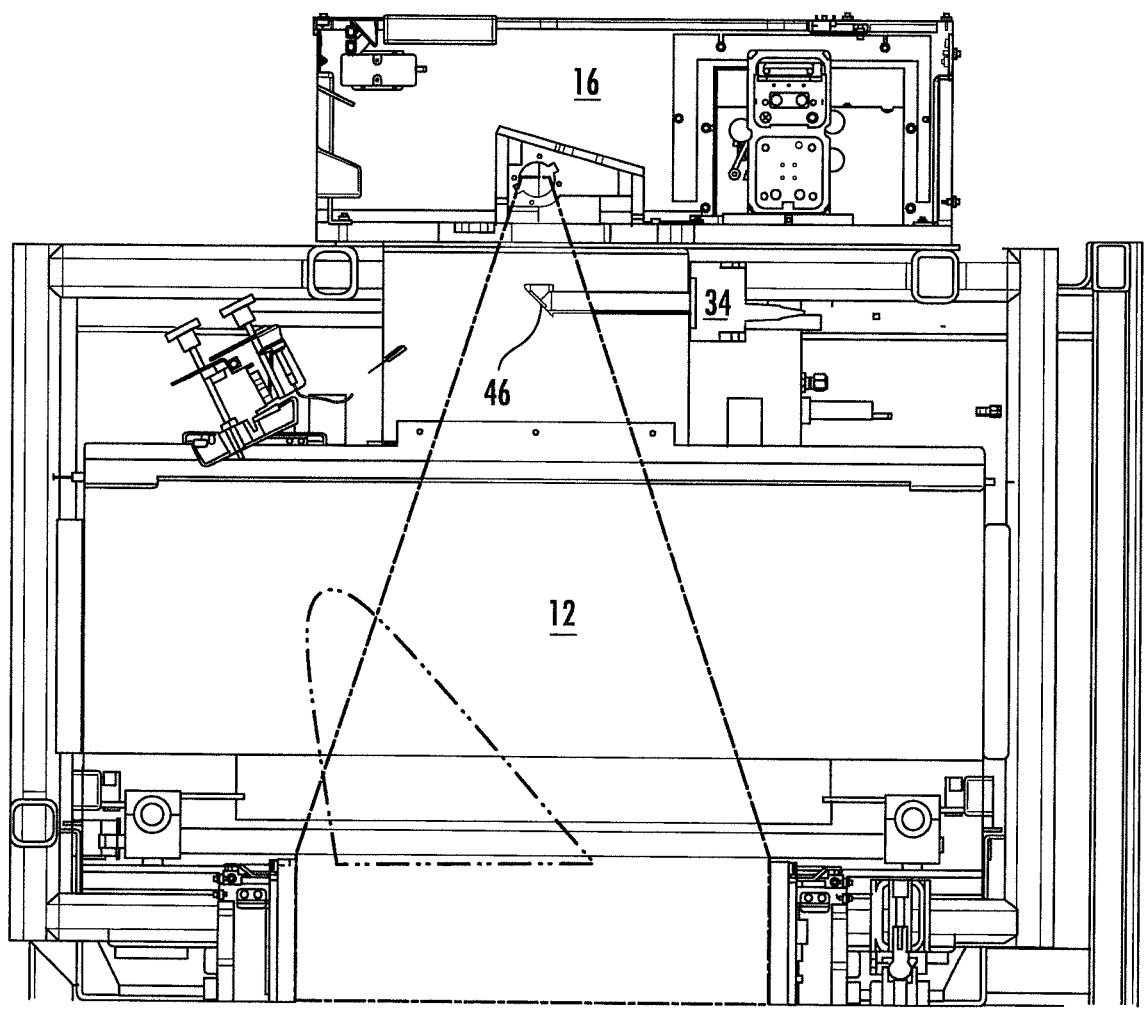
Figure 6C:
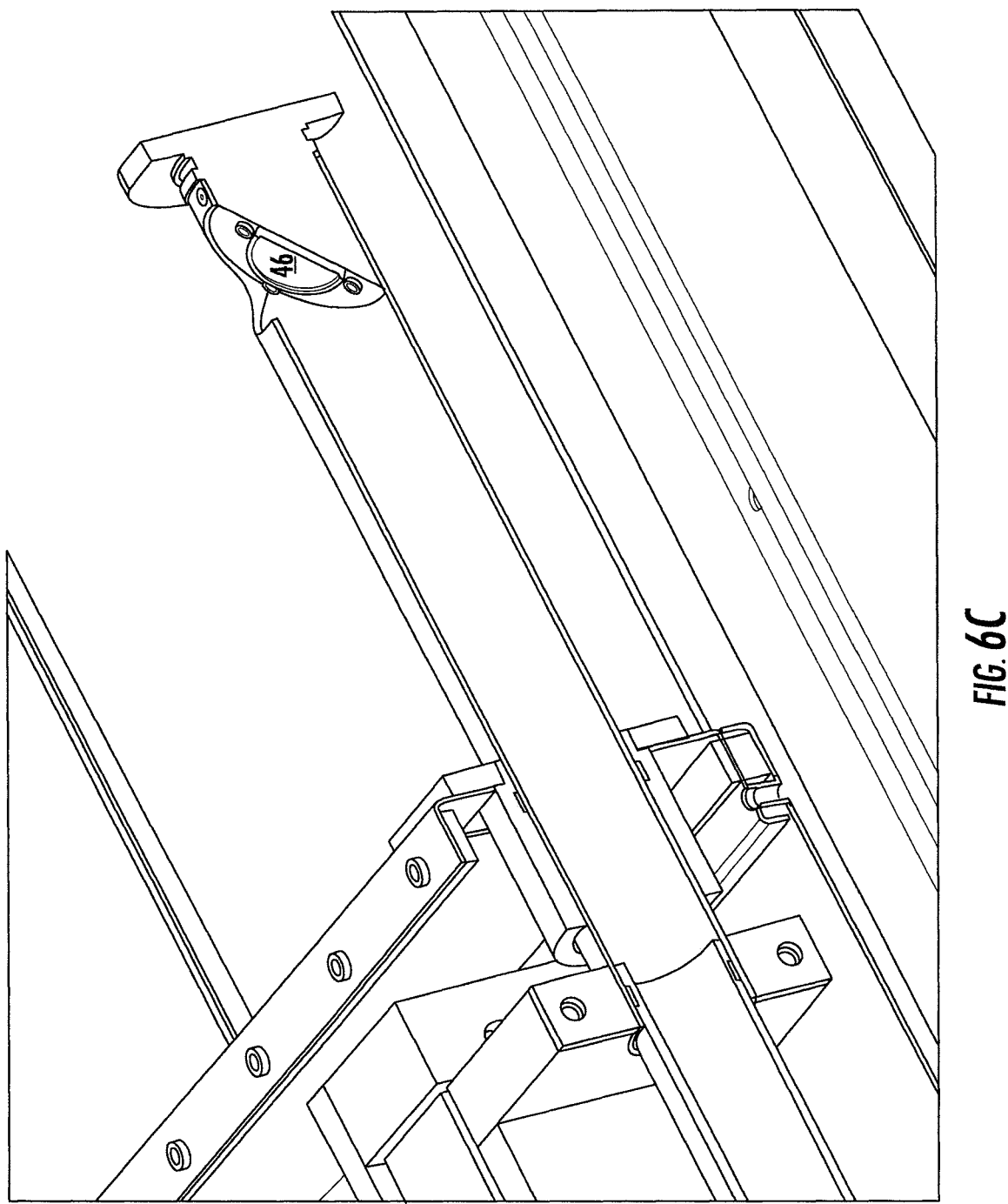
Figure 7A:
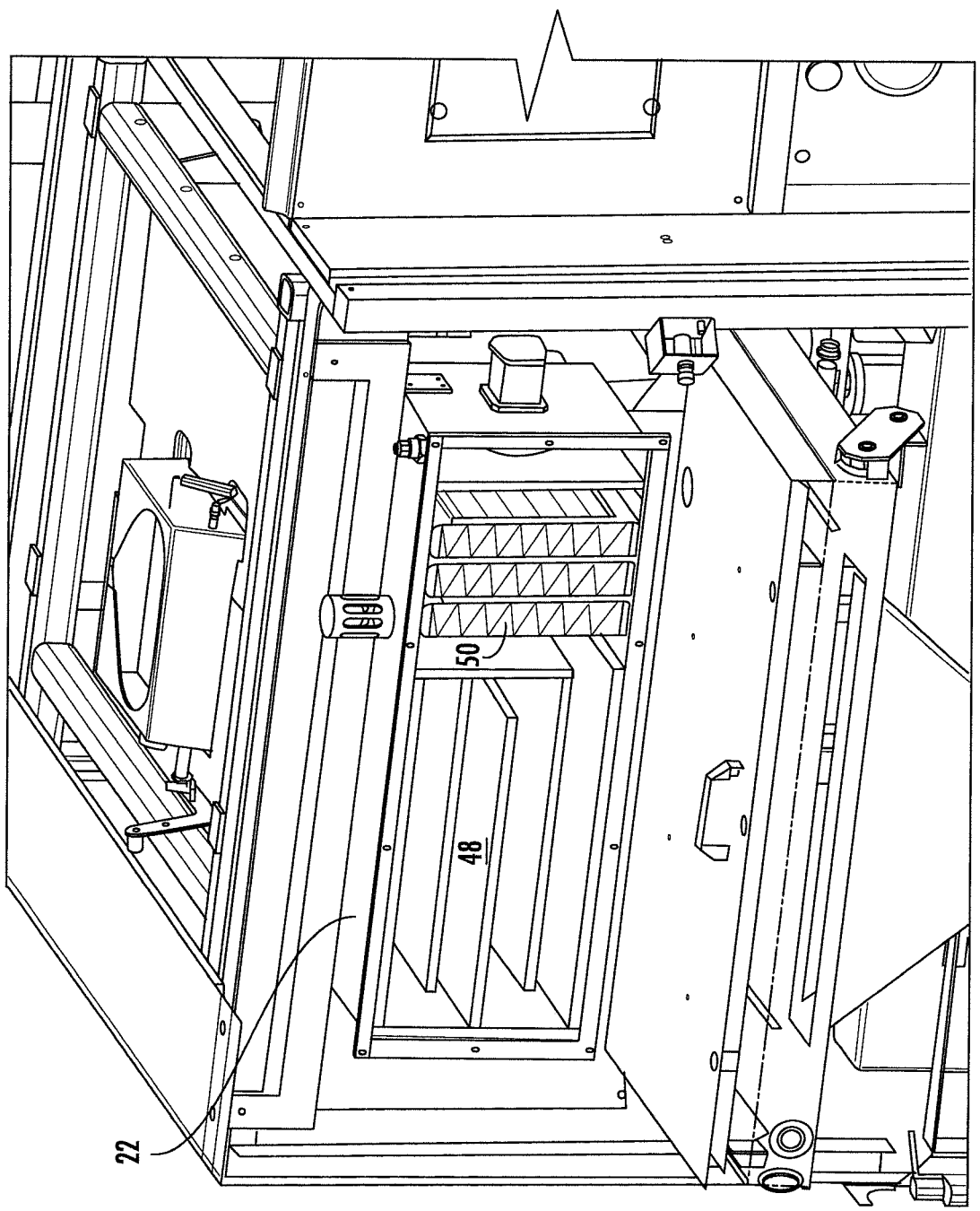
Figure 7B:
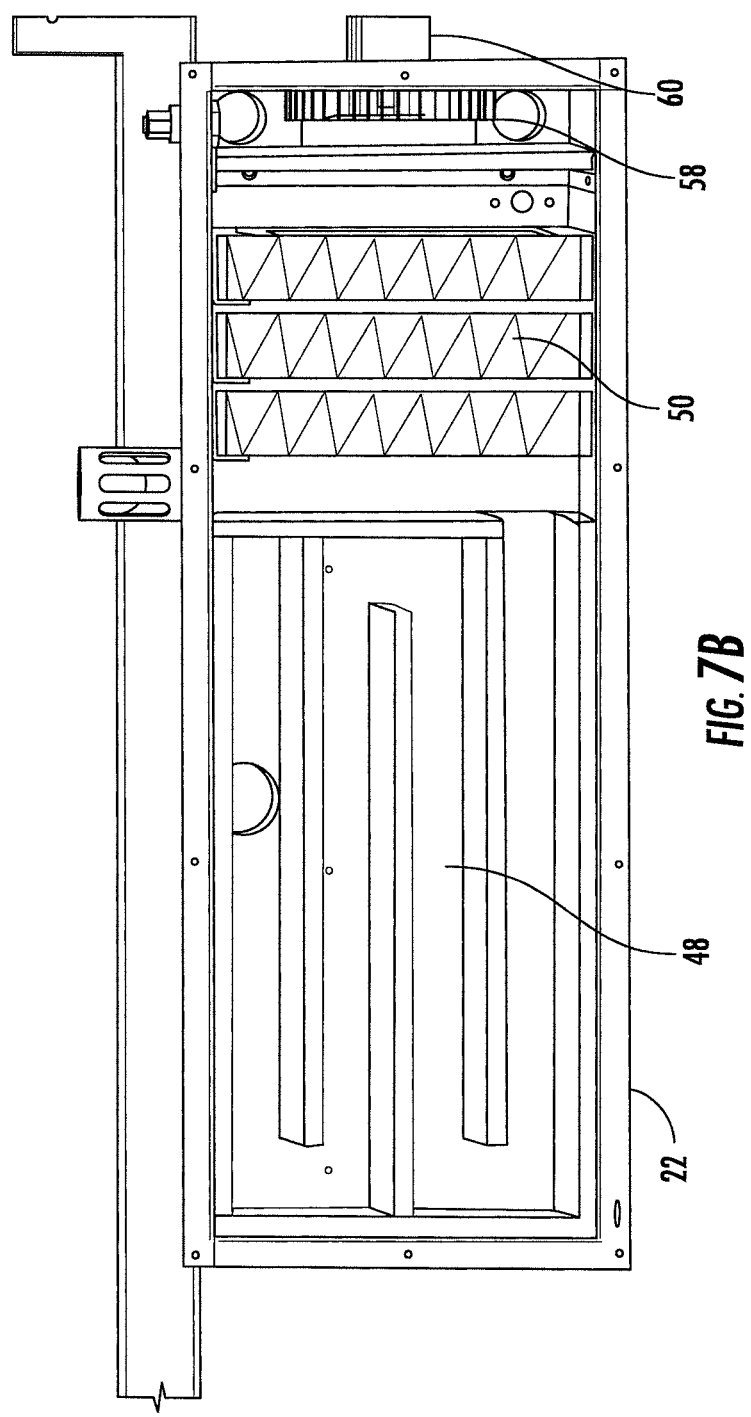
Figure 7C:
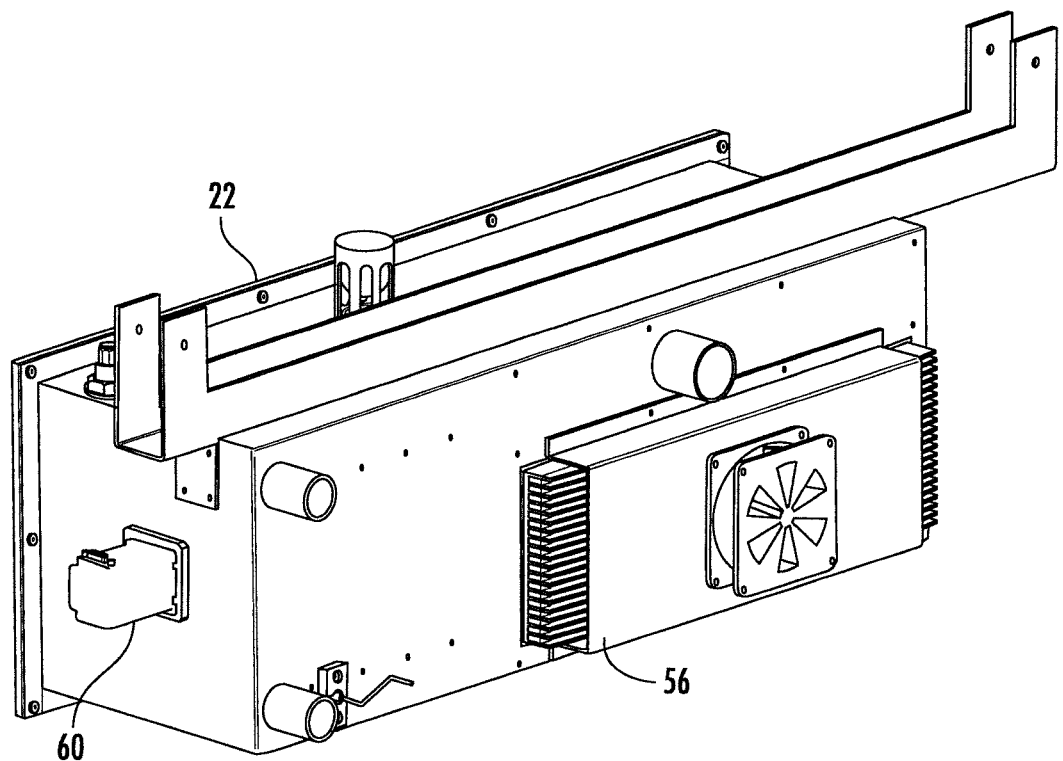
Figure 9:
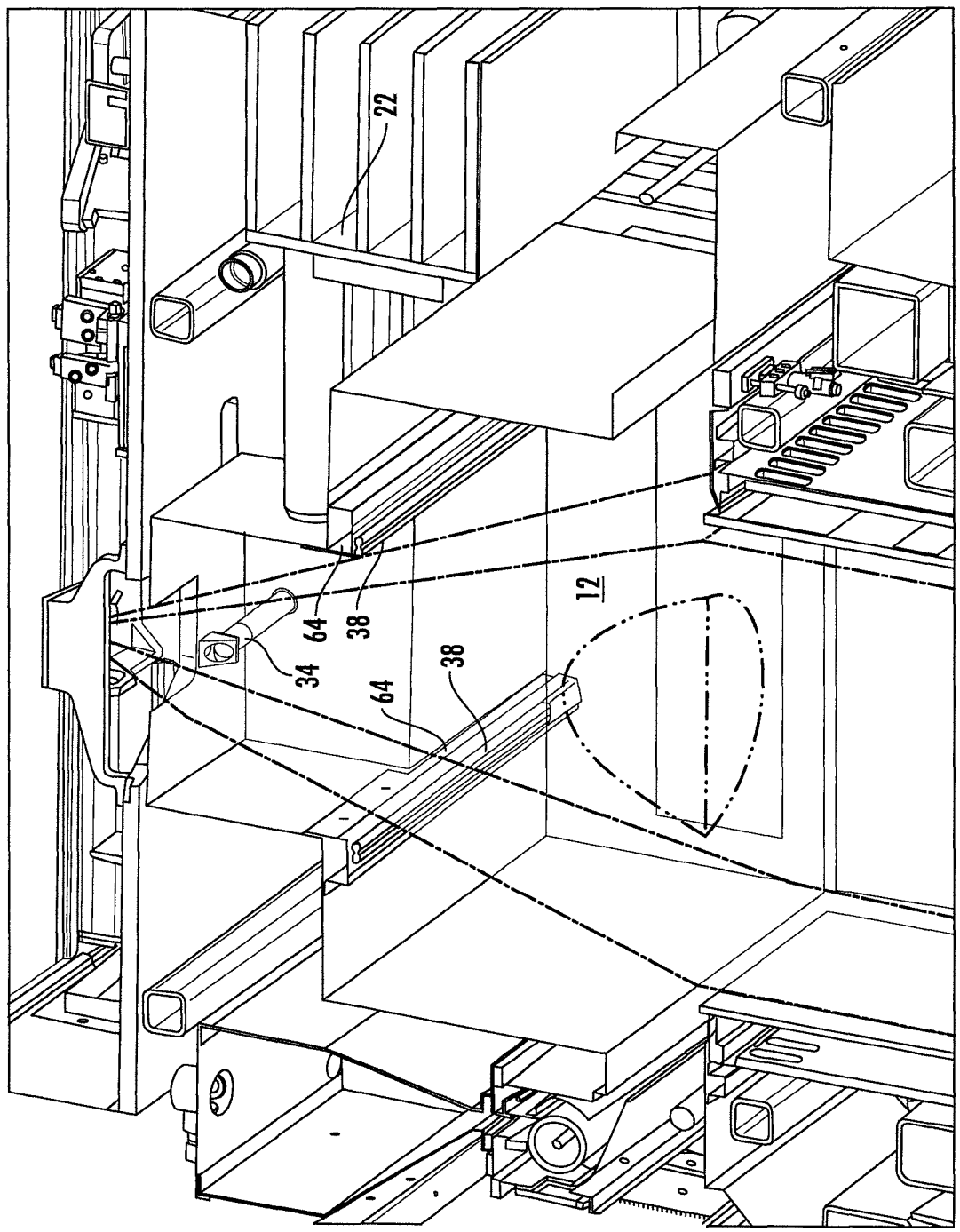

Having thus described the invention in general terms, reference will now be made to the accompanying drawings, which are not necessarily drawn to scale and are meant to be illustrative and not limiting, and wherein:

FIG. 1 is a perspective view of a laser sintering system in accordance with one embodiment of the present invention;

FIG. 2 is a side cross-sectional view of the laser sintering system of FIG. 1;

FIG. 3A is an enlarged side cross-sectional view of the roller, hopper, chute, roller heater, and other portions of the laser sintering system of FIG. 1, wherein the chute is in the down position;

FIG. 3B is an enlarged side cross-sectional view of the roller, hopper, chute, roller heater, and other portions of the laser sintering system of FIG. 1, wherein the chute is in the up position;

FIG. 4A is an enlarged perspective view of the hopper and chute of the embodiment of FIG. 1, wherein the chute is in the down position;

FIG. 4B is an enlarged perspective view of the hopper and chute of the embodiment of FIG. 1, wherein the chute is in the up position;

FIG. 5A is a side cross sectional view of the upper portion of the laser sintering system of FIG. 1, showing the laser power measurement device in the retracted position;

FIG. 5B is a side cross-sectional view of the upper portion of the laser sintering system of FIG. 1, showing the laser power measurement device in the extended position;

FIGS. 6A-6C are enlarged perspective views of the laser power measurement device (in the extended position) of a further embodiment of the present invention, wherein the mirror of the laser power measurement device includes a telescoping lube that protrudes into the build chamber through a sealed opening below the laser window (not shown);

FIG. 7A is an enlarged perspective view of a scrubber of the laser sintering system of FIG. 1 showing the internal passages and filters of the scrubber, as well as the check valve on top and blower motor on the side;

FIG. 7B is an enlarged side view of the scrubber of FIG. 7A showing the single scrubber inlet and the dual scrubber outlets (each outlet is in fluid communication with one heater bracket);

FIG. 7C is an enlarged perspective view of the scrubber of FIG. 7A showing the scrubber inlet and scrubber outlets and the heat sink and fan for cooling of the air to be scrubbed (filtered);

FIG. 8 is an enlarged perspective view of the laser sintering system of FIG. 1 showing the heater brackets (yellow) through which the cooled air from the scrubber outlets is reintroduced into the build chamber in order to heat the air (using the waste Heat of the heaters) and to help cool the heaters; also shown is the piping/duct connecting the scrubber inlet to the opening in the build chamber above the heater brackets;

FIG. 9 is an enlarged perspective view of the laser sintering system of FIG. 1 showing the heaters and heater brackets and the passages on the sides of the heater bracket for the pre-heated air to flow into the build chamber in a direction that does not adversely affect the powder layers; and FIG. 10 is an enlarged perspective view of the laser sintering system of FIG. 1 showing the return powder device in the raised position, wherein the return powder device is on an opposite side of the part bed from the hopper and chute.

DETAILED DESCRIPTION OF THE INVENTION

The present invention now will be described more fully hereinafter with reference to the accompanying drawings. In which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing improved part quality and reduced powder disposal are described and shown in the accompanying drawings with regard to specific types of laser sintering systems, it is envisioned that the functionality of the various apparatus and methods may be applied to any now known or hereafter devised powder fusing systems in which it is desired to created three dimensional objects (parts) out of powder based upon digital data representing the part to be made. Like numbers refer to like elements throughout.

With reference to FIGS. 1-10, laser sintering systems in accordance with embodiments of the present invention are illustrated that include many novel upgrades to prior art laser sintering systems that increase part quality and reduce powder disposal. These inventions not previous known or used in the art provide significant improvement to the part quality by providing consistent energy delivery to the sinterable powder so that the material properties are improved and consistent throughout the part in ail directions (x-axis (side to side in the build chamber), y-axis (front to back in the build chamber), and z-axis (bottom to top in the build chamber)). Moreover, the inventions, in particular those relating to the dual APL, provide powder layers of improved density and with no or minimum peaks, valleys, or voids that provide better flow control of laser sintered particles that enables the creation of more accurate, stronger parts and enables powder to be reused (the powder used in a laser sintering build process but not sintered) for many more build processes, thus significantly reducing the need for virgin powder (new/fresh powder that has not undergone a build process) and the need to dispose of used powder. Therefore, the present inventions significantly reduces the costs associated with laser sintering of parts, which makes parts made by laser sintering more affordable, and ultimately results in laser sintering becoming more competitive against parts made by other additive manufacturing techniques, subtractive manufacturing techniques, and other traditional manufacturing techniques.

The illustrated embodiments are designed for polymer systems that use polyamide powders or PEEK powders or other polymer powders; however, other embodiments of the present invention may be used with further materials such as metals, composites, ceramics, and any other powder materials used to form three-dimensional objects from digital data.

Turning now to the embodiment of FIG. 1, the laser sintering system 10 includes a build chamber 12, a removable part bed cart 14, and a laser assembly 16 that includes the laser, scanning mirrors and other optics similar to prior art laser sintering systems. The laser sintering system 10 also includes a control panel 18 or other user interface, such as a touch screen computer or tablet, for the operator to control and/or monitor the laser sintering system. FIG. 1 also shows portions of the laser sintering system 10 that are not inside the build chamber 12, such as the powder hopper 20, from which powder is supplied to the build chamber, and the scrubber 22 that cleans and recirculates the air (primarily nitrogen) in the build chamber.

FIG. 2 is a cross-section of the laser sintering system that illustrates additional features of the system, both inside and outside the build chamber 12. The return powder receptacle 24 receives powder that is not used during the dual APL process. Powder (not shown) deposited into the return powder receptacle 24 can be stored for later use in a subsequent build process or recirculated automatically back to the hopper 20 for use in the same or subsequent build process. FIG. 2 also illustrates components and systems within the build chamber 12 such as the roller 28, the chute 28, the image plane 30 where the powder layer is laser sintered (the top layer of the part bed 31), and the return powder device 32 (also shown in FIG. 10), which in the illustrated embodiment comprises a return powder piston. Further embodiments of the present invention comprise alternative return powder devices that transfer a portion of powder from one side of the powder distribution device to the other side of the powder distribution device in preparation for the second pass of the roller or other powder distributing device. The laser power measurement device 34 is also shown in FIG. 2 and is positioned between (along the x-axis) the laser window 36 and the heaters 38.

Certain embodiments of the present invention use the dual APL technique to distribute sinterable powder in layers. Dual APL is the process of moving the roller across the part bed 31 two times for each layer of powder distributed on the part bed. Prior art systems typically used a single pass of the roller or other powder distributing device, such as a doctor blade or a doctor blade like structure that holds powder and deposits powder as it moves across the part bed. Such systems typically have hoppers or supply powder pistons on both sides of the part bed, while other prior art systems have a single hopper but deposit powder for a first layer with a first pass and for a second layer with a second pass (by depositing powder atop the roller assembly (or other powder distributing device) and dislodging the powder on the side of the part bed opposite the hopper). Still other prior art systems use a single pass of the roller or other powder distributing device to apply powder layer in the single pass and then simply return the powder distributing device to its original position without applying a powder layer during the return movement because no powder is provided on the leading edge in the direction of the return. However, as noted below and in the enclosed documents, using the two pass dual APL process that applies powder in both the first and second passes, it has been discovered that the powder density is significantly improved, as well as quality of the surface of the powder layer applied. The density of the powder in the powder layer is important because it has been discovered that the heating and laser sintering of the denser powder is more stable as the fluence (flow) of the temporarily melted material is better controlled during laser sintering. The improved density of the layers provided by dual APL enables used powders to be used for many more build processes because even though the powder quality slightly degrades with each build process it undergoes, the used powder still can create parts with satisfactory part quality (for example, surface quality is smooth compared to prior art techniques where reused powder can lead to rough surfaces such as the well-known "orange peel" if too much powder is used too many times) and satisfactory strength. Therefore, the higher density powder layers provided by the dual APL process significantly reduce the amount of used sinterable powder that must be discarded, thus reducing the costs associated with laser sintering while providing parts of better quality and strength.

The dual APL technique comprises the following general steps:
1) powder is deposited from the hopper 20 (via chute 28) to between the roller 26 and the part bed 31;
2) the roller moves across the part bed to distribute the initial layer of powder over the part bed;
3) the return powder device 32 is in a lowered position such that as the roller moves over the return powder device, any powder remaining from the first pass over the part bed is deposited into the gap created by the return powder device, such that the roller moves over the powder above the return powder device;
4) the return powder device raises so that the powder above the return powder device is between the roller and the part bed;
5) the roller moves across the part bed to distribute the remaining powder into any gaps, voids, or other portions missing powder, to level any waves or other raised portions of powder, and to increase the density of the powder layer; and
6) the roller is returned to its home position (show in FIG. 2) while the laser scanning step occurs.

The dual APL is distinguishable from prior art techniques because it comprises two passes of distributing powder, which is not obvious because two passes requires additional time for each layer, which increases the build time, relative to a prior art single pass system, for each part which reduces the throughput of a laser sintering system if all other parameters are kept constant. Additional information relating to the powder density and part strength is provided in the enclosed documentation.

Turning now to FIGS. 3A-4B, certain embodiments of the present invention comprise a chute 28 positioned between the hopper 20 and the surface between the roller home position (where the roller is positioned during the laser scanning operation) and the part bed so that a new supply of powder can be deposited in front of the roller before the roller's first pass across the part bed. The chute of the illustrated embodiments comprises a slot extending along the y-axis (front to back of the system) that is rotatable about an axis aligned along the y-axis. The chute 28 may be rotated automatically or it may be moved by the motion of the roller, such as by contact with at least one pin 40 positioned on the roller assembly 42 that moves the roller 26. For example, the roller 26 or other portion of the roller assembly 42 may push the chute from the down position in FIGS. 3A and 4A to the up position in FIGS. 38 and 4B at the beginning of the first pass (first APL) across the part bed, and the pin 40 or other portion of the roller assembly may push the chute back to the down position at the end of the second pass (second APL) across the part bed such that the chute is always in the down position when the roller is in the home position. The chute may be spring loaded or otherwise biased to remain in the up position unless it is held in the down position by the pin 40 or other portion of the roller assembly.

The chute 28 simply serves as a conduit to deposit powder released from the hopper near the roller in a manner that minimizes dusting or other creation of airborne particles. The illustrated embodiment is a simple slot, but further embodiments of the present invention include alternative chutes that likewise reduce the dusting, spreading, or other undesirable movement of the deposited powder. The chute 28 also comprises a chute heater 44 that pre-heats the powder in the chute so that the deposited powder is closer to the temperature the powder must attain when it is spread on the part bed prior to the melting/fusing of the powder particles by the laser. By pre-heating the powder, the build process time may be reduced. Moreover, the chute heater or other heater in the area may be used to pre-heat the roller. The roller heater, whether it is the chute heater or other heater, of certain embodiments may keep the surface temperature of the roller at a desired level so that the roller distributes the powder in the desired manner. While the roller is in the home position during laser sintering of the powder layers, the roller is slowly rotated (slewed) so that the roller surface is evenly heated. Further embodiments of the present invention include alternative roller heaters to heat the surface of the roller.

Turning now to the automatic laser calibration of certain embodiments of the present invention, FIGS. 5A-6C illustrate a laser power measurement device that can selectively determine the laser power (and energy) delivered to the layer of sinterable powder. Because the build chamber is hot and includes fumes and gases that may cause surfaces, such as the laser window, to lose transparency, prior art systems have not measured the laser power within the build chamber but have instead measured the laser power prior to (upstream of) the laser beam entering the build chamber or measured the laser power during periodic servicing. Because the transparency of the laser window and the air within the build chamber may change during a single build process, certain embodiments of the present invention measure the laser power within the build chamber periodically during the build to determine changes in the laser power so that the laser can be adjusted/calibrated to ensure that the powder layers are receiving the desired amounts of energy (such as by changing the laser power or changing the scanning speed that the laser beam is moved across the powder layers).

The laser power measurement device 43 of the illustrated embodiments includes a laser power sensor of a type known in the art and a telescoping mirror 46 that may be selectively positioned in the laser path to reflect the laser beam to the sensor for measurement purposes. As shown in FIG. 5A, the mirror 46 in the retracted position is outside the range of motion of the laser beam so that the laser power measurement device does not block the laser beam from the part bed. As shown in FIG. 5B, the mirror 46 in the extended position is positioned within the range of motion of the laser beam, such as in the center, so that the laser beam may be selectively projected to the sensor within the laser power measurement device 34. FIGS. 6A-6C illustrate one embodiment of the laser power measurement device 43 in which the mirror 46 is moved by a hollow telescoping shaft that is sealed about its entrance into the build chamber 12. Further embodiments of the present invention include alternative laser power measurement devices for measuring the power of the laser beam within the build chamber.

Because the heaters 58 are radiant heaters and it is not necessary or desired that the laser power measurement device be heated and in order to not block the radiated heat from heating the powder layers, the present invention has the laser power measurement device positioned above the heaters near the laser window 36; however, further embodiments of the present invention include the laser power measurement device at any location in the build chamber where the laser can be in optical communication with the laser power measurement device.

The present invention also includes in certain embodiments a scrubber to clean and filter the air within the build chamber. FIGS. 7A-7C illustrate a scrubber 22 in accordance with one embodiment, that includes an initial cooling section 48 and a filtration section 50. The scrubber 22 includes a scrubber inlet 52 through which air is pulled from the build chamber 12 (such as from/above the heaters 38 and below the laser window 36) and two scrubber outlets 54 through which air is expelled back to the build chamber (such as into a heater bracket as described below). The cooling section 48 is a serpentine passage or other structure that causes the relatively hot air from the build chamber 12 to be cooled, such as with the use of a heat sink and fan assembly 56 in thermal communication with the passages in the cooling section. The air is cooled to assist in the precipitation of contaminants from the air. The air is then passed through the filter section 50 comprising one or more filters that capture the contaminants from the air passing therethrough. The air is circulated through the scrubber 22 by the blower fan 58 rotated by the blower motor 60.

FIGS. 8 and 9 show the pipe or tubing that connects the build chamber to the scrubber inlet 52, as well as one of the build chamber inlets 62 for the return of the air from the scrubber. The build chamber inlets 62 are in flow communication with the respective heater bracket 84 in the build chamber 12. The relatively cool air from the scrubber flows into the heater bracket 64 in order to transfer heat from the heater bracket 64 and the heaters 38, thereby (i) assisting in the cooling of the heaters, which in some embodiments is desirable to increase the operable life of the heaters and/or to increase the performance of the heaters, and (ii) pre-heating returned scrubbed air. The pre-heated air passes out of the array of holes on the side of each heater bracket 64. The array of holes are sized and positioned to minimize the amount of turbulence or other undesirable air flow within the build chamber (for example, the powder should not be moved by the air in the build chamber).

The enclosed documentation further describes the apparatus and processes of the present invention, as well as test results produced therefrom. For example, the chart entitled MP Data show the significant improvements in mechanical properties relative to prior art techniques. The columns of the MP Data chart are for "Recycle Runs" where runs 1 through 4 were conducted without adding any new powder to determine the deterioration in part mechanical properties based upon the lack of new/fresh/virgin powder. The Recycle Runs were used to make a plurality of ASTM638 bars for which the mechanical properties of Table 1 were tested for in accordance with industry standard practices known by those of skill in the art. The Recycle Runs included the respective amounts of fresh (previously unused powder), overflow (powder previously used but retrieved from overflow reservoir and not the part cake), and part cake (powder previously used and retrieved from the part cake). The Recycle Runs were conducted with generally consistent build parameters and part parameters, including but not limited to a fill laser power of 60 W, a fill scan count of 1, a fill scan speed of 12 M/sec, an outline laser power of 15 W, an outline fill scan count of 1, a slicer fill scan spacing of 0.2 mm, and a sinter scan of 1. As evidenced by the results for Runs 1, 2, and 4, the decreases in mean density, tensile modulus, and tensile strength are significantly improved compared to prior art laser sintering apparatus and methods. Test data such as provided in the MP Data chart demonstrate that the embodiments of the present invention can be used to reduce the need for virgin powder and the corresponding need to dispose of used powder.

TABLE 1

MP Data

| Mechanical Properties | Recycle Run 0 | Recycle Run 1 | Recycle Run 2 | Recycle Run 3 | Recycle Run 4 |
|---|---|---|---|---|---|
| Density (LT Front) (g/cc) | | 0.975 | 0.971 | | 09.67 |
| Density (RT Front) (g/cc) | | 0.973 | 0.974 | | 0.957 |
| Density (Middle) (g/cc) | | 0.973 | 0.974 | | 0.964 |
| Density (LT Back) (g/cc) | | 0.973 | 0.968 | | 0.964 |
| Density (RT Back) (g/cc) | | 0.971 | 0.974 | | 0.957 |
| MEAN DENSITY | | 0.973 | 0.972 | | 0.962 |
| Tensile Modulus (X) | | 1911 | 1925 | | 1798 |
| Tensile Modulus (X) | | 1887 | 1948 | | 1771 |
| Tensile Modulus (X) | | 1878 | 1938 | | 1845 |
| Tensile Modulus (X) | | 1939 | 1917 | | 1801 |
| X MEAN MODULUS | | 1903.75 | 1932.00 | | 1803.75 |
| Tensile Modulus (Y) | | 1962 | 1855 | | 1904 |
| Tensile Modulus (Y) | | 2012 | 1946 | | 1893 |
| Tensile Modulus (Y) | | 1872 | 1897 | | 1945 |
| Tensile Modulus (Y) | | 1873 | 1861 | | 1794 |
| Y MEAN MODULUS | | 1929.75 | 1889.75 | | 1884.00 |
| Tensile Modulus (Z) | | 1924 | 2003 | | 1761 |
| Tensile Modulus (Z) | | 1934 | 1879 | | 2150 |
| Tensile Modulus (Z) | | 1938 | 2003 | | 1863 |
| Tensile Modulus (Z) | | 1915 | 1856 | | 1879 |
| Z MEAN MODULUS | | 1927.75 | 1935.25 | | 1913.25 |
| Tensile Strength (X) | | 50.4 | 49.5 | | 48.9 |
| Tensile Strength (X) | | 50.3 | 50.0 | | 47.4 |
| Tensile Strength (X) | | 49.7 | 49.7 | | 49.4 |
| Tensile Strength (X) | | 49.4 | 48.8 | | 47.8 |
| X MEAN STRENGTH | | 50.0 | 49.5 | | 48.4 |
| Tensile Strength (Y) | | 50.4 | 48.6 | | 48.6 |
| Tensile Strength (Y) | | 50.6 | 50.2 | | 49.4 |
| Tensile Strength (Y) | | 49.3 | 50.1 | | 49.0 |
| Tensile Strength (Y) | | 49.0 | 48.5 | | 47.7 |
| Y MEAN STRENGTH | | 49.8 | 49.4 | | 48.7 |
| Tensile Strength (Z) | | 49.1 | 47.7 | | 46.7 |
| Tensile Strength (Z) | | 49.8 | 48.2 | | 47.6 |
| Tensile Strength (Z) | | 50.4 | 47.0 | | 45.8 |
| Tensile Strength (Z) | | 48.1 | 48.1 | | 46.9 |
| Z MEAN STRENGTH | | 49.4 | 47.8 | | 46.8 |
| Elongation at Break (X) | | 18.137% | 14.727% | | 19.061% |
| Elongation at Break (X) | | 18.975% | 19.577% | | 17.212% |
| Elongation at Break (X) | | 15.976% | 20.259% | | 17.724% |
| Elongation at Break (X) | | 14.579% | 16.321% | | 22.901% |
| X MEAN EAB | | 16.917% | 17.716% | | 19.225% |
| Elongation at Break (Y) | | 14.991% | 14.734% | | 15.401% |
| Elongation at Break (Y) | | 16.680% | 16.386% | | 22.648% |
| Elongation at Break (Y) | | 13.161% | 19.850% | | 24.640% |
| Elongation at Break (Y) | | 17.391% | 17.899% | | 16.648% |
| Y MEAN EAB | | 15.556% | 17.217% | | 19.834% |
| Elongation at Break (Z) | | 8.324% | 7.075% | | 8.899% |
| Elongation at Break (Z) | | 8.328% | 6.926% | | 5.981% |
| Elongation at Break (Z) | | 9.280% | 5.626% | | 5.724% |
| Elongation at Break (Z) | | 6.944% | 6.297% | | 7.321% |
| Z MEAN EAB | | 8.219% | 6.482% | | 6.981% |

The present invention in various embodiments combines the above apparatus and methods to improve the part quality of laser sintered parts and to improve the useful life of unused laser sinterable powders. Thus, the present invention provides significant technical and financial benefits to users of laser sintering systems that were previously unavailable through prior art technologies.

Many modifications and other embodiments of the invention set forth herein will come to mind to one skilled in the art to which the invention pertains having the benefit of the teachings presented in the foregoing descriptions and the associated drawings. Therefore, it is to be understood that the invention is nor to be homed to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

Accordingly, the present invention provides for the production of three-dimensional objects with improved build and support materials. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

That which is claimed:

1. A method for laser sintering a three dimensional object based upon design data and from a sinterable powder, the method comprising:
   depositing a measured amount of sinterable powder between a powder distribution device and a part bed;
   distributing the measured amount of sinterable powder on the part bed to form a first layer of the sinterable powder and an amount of residual powder remaining from the sinterable powder forming the first layer;
   positioning the powder distribution device such that a return portion of the residual powder is between the part bed and the powder distribution device;
   distributing the return portion of the residual powder on the part bed adding to the first layer of the sinterable powder; and
   laser-sintering the first layer of the sinterable powder,
   wherein the return portion of the residual powder is formed from distributing the sinterable powder on the part bed to form the first layer, and
   wherein both distributing steps are performed before the first layer of sinterable powder comprising the residual powder is substantially laser sintered.

2. A method according to claim 1, wherein positioning the powder distribution device comprises:
   lowering a return powder device having the return portion of the residual powder positioned thereon; and
   raising the return powder device after the powder distribution device has moved over the return powder device and the return portion of the residual powder.

3. A method according to claim 1, wherein depositing sinterable powder comprises supplying the sinterable powder through a chute.

4. A method according to claim 3, wherein supplying the sinterable powder through a chute further comprises preheating the sinterable powder within the chute.

5. A method according to claim 3, wherein supplying the sinterable powder through a chute further comprises preheating the roller positioned proximate the chute.

6. A method according to claim 1, further comprising measuring a power of a laser beam within a build chamber.

7. A method according to claim 1, wherein distributing the return portion of the residual powder comprises increasing the density of the layer of sinterable powder.

8. A method according to claim 1, wherein distributing the return portion of the residual powder comprises filling gaps within the layer of sinterable powder.

9. A method according to claim 1, wherein distributing the return portion of the residual powder comprises leveling raised portions of the layer of sinterable powder.

10. A method of applying a single layer of sinterable powder for a laser sintering system, the method comprising:
    depositing a measured amount of sinterable powder between a powder distribution device and a part bed;
    distributing the measured amount of sinterable powder on the part bed in a first pass to form the single layer of sinterable powder and residual powder remaining from the sinterable powder forming the single layer;
    positioning the powder distribution device to have a return portion of the residual powder be between the part bed and the powder distribution device; and
    increasing the density of the single layer of sinterable powder in a second pass, wherein the second pass is in an opposite direction of the first pass and distributes the residual powder on the single layer of sinterable powder,
    wherein the first pass and the second pass are performed before the single layer of sinterable powder comprising the residual powder is substantially laser sintered.

11. A method according to claim 10, wherein increasing the density of the single layer of sinterable powder comprises filling gaps within the single layer of sinterable powder with the residual powder.

12. A method according to claim 10, wherein increasing the density of the single layer of sinterable powder comprises leveling raised portions of powder of the single layer of sinterable powder with the residual powder.

13. A method for laser sintering a three dimensional objects based upon design data and from a sinterable powder, the method comprising:
depositing a measured amount of sinterable powder between a powder distribution device and a part bed;
distributing the measured amount of sinterable powder using a powder distribution device on the part bed to form a first layer of sinterable powder and a return portion of residual powder, the residual powder remaining from the sinterable powder forming the first layer;
distributing the return portion of the residual powder on the part bed using the powder distribution device to further form the layer of sinterable powder; and
laser-sintering the layer of sinterable powder, wherein both distributing steps are performed before the layer of sinterable powder is substantially laser sintered.

14. A method for laser sintering a three dimensional object based upon design data and from a sinterable powder, the method comprising:
depositing sinterable powder between a powder distribution device and a part bed;
distributing the sinterable powder on the part bed to form a first layer of the sinterable powder and residual powder remaining from the sinterable powder forming the first layer;
positioning the powder distribution device to have a return portion of the residual powder be between the part bed and the powder distribution device, the positioning comprising:
lowering a return powder device having the return portion of the residual powder positioned thereon; and
raising the return powder device after the powder distribution device has moved over the return powder device and the return portion of the residual powder;
distributing the return portion of the residual powder on the part bed adding to the first layer of the sinterable powder; and
laser-sintering the first layer of the sinterable powder,
wherein the return portion of the residual powder is formed from distributing the sinterable powder on the part bed to form the first layer.

* * * * *